(12) United States Patent
Meador et al.

(10) Patent No.: US 10,446,920 B1
(45) Date of Patent: *Oct. 15, 2019

(54) AEROGEL-BASED ANTENNAS FOR AEROSPACE AND TERRESTRIAL APPLICATIONS

(71) Applicant: The United States of America, as represented by the Administrator of the National Aeronautics and Space Administration, Washington, DC (US)

(72) Inventors: Mary Ann B. Meador, Strongsville, OH (US); Felix A. Miranda, Olmsted Falls, OH (US); Frederick W. Van Keuls, Westlake, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,894

(22) Filed: Apr. 11, 2016

Related U.S. Application Data

(63) Continuation-in-part of application No. 13/653,027, filed on Oct. 16, 2012, now Pat. No. 9,356,341.

(60) Provisional application No. 62/145,893, filed on Apr. 10, 2015.

(51) Int. Cl.
| | | |
|---|---|---|
| *H01Q 1/38* | (2006.01) |
| *H01Q 1/08* | (2006.01) |
| *H01Q 21/00* | (2006.01) |
| *H01Q 1/28* | (2006.01) |
| *H01Q 1/27* | (2006.01) |
| *H01Q 1/32* | (2006.01) |

(52) U.S. Cl.
CPC ............... *H01Q 1/38* (2013.01); *H01Q 1/085* (2013.01); *H01Q 21/0087* (2013.01); *H01Q 1/273* (2013.01); *H01Q 1/28* (2013.01); *H01Q 1/32* (2013.01)

(58) Field of Classification Search
None
See application file for complete search history.

(56) References Cited

U.S. PATENT DOCUMENTS

| | | | |
|---|---|---|---|
| 6,740,416 B1 | 5/2004 | Yokogawa et al. | |
| 8,067,478 B1 | 11/2011 | Meador et al. | |
| 9,356,341 B1* | 5/2016 | Meador .................. | H01Q 1/38 |
| 2006/0092079 A1 | 5/2006 | de Rochemont | |
| 2011/0095948 A1* | 4/2011 | Alexopoulos ........ | H01Q 1/2283 343/700 MS |
| 2011/0206925 A1* | 8/2011 | Kissel ...................... | C09D 7/62 428/319.1 |
| 2012/0299778 A1* | 11/2012 | Yen ......................... | H01L 23/48 343/700 MS |

(Continued)

*Primary Examiner* — Trinh V Dinh
(74) *Attorney, Agent, or Firm* — Robert H. Earp, III; William M. Johnson

(57) ABSTRACT

Systems and methods for lightweight, customizable antenna with improved performance and mechanical properties are disclosed. In some aspects, aerogels can be used, for example, as a substrate for antenna fabrication. The reduced weight and expense, as well as the increased ability to adapt antenna designs, permits a systems to mitigate a variety of burdens associated with antennas while providing added benefits.

20 Claims, 29 Drawing Sheets

(56) References Cited

U.S. PATENT DOCUMENTS

2013/0285879 A1 10/2013 Wheeler
2014/0145891 A1* 5/2014 Palevsky .............. H01Q 9/0435
343/746

* cited by examiner

6FDA

QPSK Modulation

/4 DQPSK Modulation

AEROGEL-BASED ANTENNAS FOR AEROSPACE AND TERRESTRIAL APPLICATIONS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

CROSS-REFERENCE TO RELATED APPLICATIONS

This application is a Continuation-in-Part of pending U.S. patent application Ser. No. 13/653,027 entitled "AEROGEL-BASED ANTENNAS FOR AEROSPACE AND TERRESTRIAL APPLICATIONS" filed on Oct. 16, 2012 and claims the benefit of U.S. Provisional Patent Application Ser. No. 62/145,983 Entitled "DESIGN AND DEVELOPMENT OF AEROGEL-BASED ANTENNAS FOR AEROSPACE APPLICATION: A FINAL REPORT TO THE NARI SEEDLING" filed on Apr. 10, 2015. The entireties of the above-noted applications are incorporated by reference herein.

BACKGROUND

This disclosure relates generally to antennas and, more particularly, to the integration of aerogels into antenna design.

Advances in the design and optimization of communications equipment are of paramount interest in many areas. Entities ranging in size from entire militaries to individual travelers can benefit from communications equipment providing better performance than previous generations, especially when the equipment is also lighter, stronger or less expensive.

Critical to an ever-increasing number of electronic devices (e.g., computers, cell phones, navigation systems, et cetera) are transmit/receive (Tx/Rx) antennas. Tx/Rx antennas improve, and are indeed often necessary, for a variety of systems employing wireless signals, such as voice, data, navigation, and others.

Groups of systems transmitting and receiving signals via antenna are often collocated. For example, a military or commercial aircraft such as a Boeing 737 can have dozens of antenna systems integrated throughout the aircraft, sometimes in excess of 100. Even an individual service member in a western military can have a variety of antennas on their person, as voice, data, navigation and other Tx/Rx systems are common in an operational environment. Although these two example applications are different, they share several common requirements. Both stand to benefit from reduction of the number, weight and expense of antennas. Likewise, both examples benefit from increases to the robustness, performance and adaptability of antennas.

Groups of antennas can also be used in arrays. Many current antennas used in large-scale applications are arrays based on Monolithic Microwave Integrated Circuits (MMIC). These arrays exhibit relatively low efficiency, can be very heavy, and can be expensive to acquire and maintain. Alternatively, more affordable arrays (which are primarily passive) are made with standard commercially available substrates. Current commercial substrates are manufactured in quantity with arbitrary dielectric properties and thicknesses, limiting possible applications and adaptability. Customizing commercial substrate applications comes at increased expense, and still may not support the ideal size, weight, performance and mechanical properties sought by a purchaser.

Accordingly, there is a need to design and integrate antennas utilizing materials with suitable properties that improve the performance, adaptability, portability and affordability of the antennas.

SUMMARY

The following presents a simplified summary in order to provide a basic understanding of some features of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with utilizing aerogels in antenna applications.

In one aspect, an antenna fabricated on an aerogel substrate is provided.

In another aspect, antennas that can be readily designed to specific material and electrical properties are provided.

In still another aspect, a plurality of aerogel-based antennas can be employed within array antennas.

In some aspects, flexible aerogel substrates can be employed to develop flexible antennas.

In another aspect, aerogel substrates and antennas thereupon can be molded to conform to non-planar contours.

In yet another aspect a means is provided that facilitates the aforementioned techniques.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

DETAILED DESCRIPTION

Figure 1A:
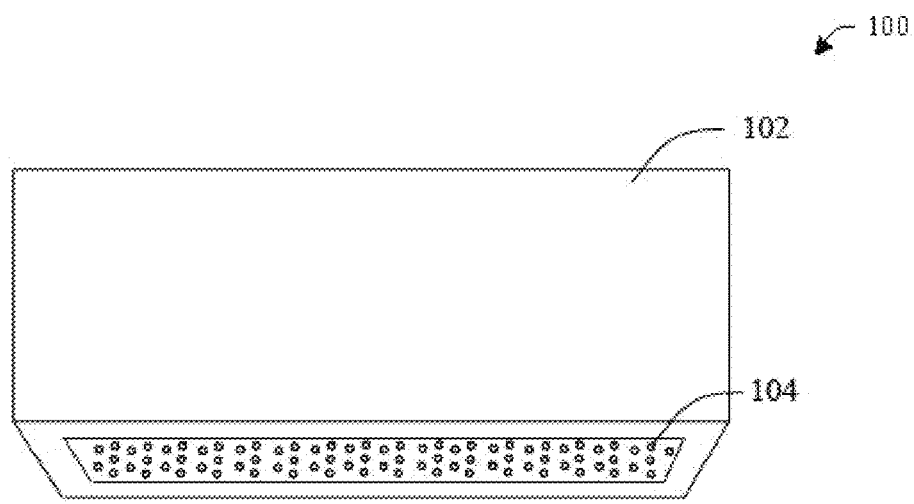
FIGS. 1A and 1B illustrate a diagram of a sample and an example diagram of metallized aerogel samples in accordance with some aspects herein.

Systems and methods employing aerogel-based antennas can be used to improve antenna utility while reducing drawbacks associated with known antenna systems. Customizable, low-density aerogels can be used in conjunction with and for the fabrication of antennas to increase their utility. These antennas can replace others in single-antenna application, can function in place of multiple antennas, or can be combined in complex array systems, such as phased array antenna utilizing a plurality of individual antennas.

As used herein, "aerogel" can refer to highly porous solids in which the liquid component of a gel is replaced with gas or analogous substances. Aerogels and analogous materials are typified by low density and low dielectric permittivity. Such materials can, but need not, be produced via supercritical drying. While aspects herein can be directed toward polyimide (PI) aerogels, it can be appreciated, upon study of the disclosures herein, that other variants can be used without departing from the scope and spirit of applicants' innovation.

As used herein, "metallization" and variants of the term generally relate to applying metals to the surface of non-metallic objects. Further details relating to processes are described infra, and other means or techniques will be appreciated in view of the disclosures herein.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices can be shown in block diagram or another simplified form in order to facilitate describing these aspects.

The word "exemplary" is used herein to mean serving as an example, instance, or illustration. Any aspect or design described herein as "exemplary" is not necessarily to be construed as preferred or advantageous over other aspects or designs.

As used in this application, the terms "component", "module", "system", and the like can refer to a computer-related entity, either hardware, a combination of hardware and software, software, or software in execution, unless an alternative use is apparent (e.g., substrate component for printed circuit can be construed as electronic hardware, but is understood as a physical element). In the context of computer-related entities, a component can be (but is not limited to), for example, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, some aspects of the use or manufacture of physical and/or logical structures described herein may be implemented as a method, apparatus, or article of manufacture using standard programming and/or engineering techniques to produce software, firmware, hardware, or any combination thereof, in various versions, to control a computer to implement some disclosed aspects. These implementations can also extend to programming, circuitry, and/or other devices designed to employ or interface with antennas as set forth herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used.

While additional details will be set forth throughout, polyimide aerogels as described herein can, in some embodiments, be made from 2,2'-dimethylbenzidine (DMBZ) and biphenyl 3,3',4,4'-tetracarbozylic dianhydride (BPDA) cross-linked with 1,3,5-triaminophenoxybenzene (TAB).

Variants of aerogels and related materials can also be employed in various capacities throughout. For example, systems and/or methods can employ porous polyimides fabricated through, for example, extraction of porogens from precursor films, use of mesoporous nanoparticles fillers in the films, and vapor induced phase separation at high temperatures. The fabrication of porous polyimide aerogels can be accomplished by cross-linking anhydride capped oligomers with TAB, followed by performing steps including chemical imidization at room temperature and supercritical liquid $CO_2$ extraction. The densities of such aerogels can be customized depending on the oligomers used. Aerogels such as these and others can be fabricated as three-dimensional pieces with high compressive modulus or thin, flexible films with high tensile strength.

Materials used in the production of aerogels and other materials relevant to the disclosures herein can include (but are not limited to) 1, 3, 5-triaminophenoxybenzene (TAB), pyridine, acetic anhydride, and anhydrous N-methylpyrrolidinone (NMP), 2,2'-dimethylbenzidine (DMBZ), 4,4'-oxydianiline (ODA), benzophenone-3,3',4'4'-tetracarboxylic dianhydride (BTDA), and biphenyl-3,3',4,4'-tetracarboxylic dianhydride (BPDA).

In preparing to make aerogels in accordance with the innovation, dianhydrides can be dried at temperature (e.g., 125° C.) in a vacuum for a desired length of time (e.g., 24 hours) before use. In some embodiments, other reagents can be used without further purification.

In some embodiments, polyimide aerogels can be prepared using either BPDA or BTDA as the dianhydride (e.g., degree of polymerization n=30). Diamines can include ODA, DMBZ, a mixture of the two, and others.

In some embodiments, aerogel properties (e.g., density, mechanical properties) can depend on shrinking that occurs during gelation. Different formulations of aerogels can be employed to reduce or increase shrinkage to achieve a particular specification. Aerogels including a mixture of BPDA and DMBZ can result in reduced shrinkage and lower density, while BTDA and ODA can result in greater shrinkage and higher density. This can be due to increased rigidity of BTDA polymer chains compared to ODA and/or less interaction between the gelation solvent (NMP) and the polymer backbone chain (e.g., main chain of the polymer). ODA aerogels can also be less brittle than DMBZ aerogels.

Aerogel geometry can be defined by a variety of fabrication techniques. In some embodiments, polyimide aerogels can be fabricated from a mold (e.g., silicone mold). Further processing can include sanding to a precise size. Various other methods of sizing can include cutting and polishing to ensure right-sized, smooth specimens with parallel surfaces. Sizing of an aerogel portion, sample or substrate can be calculated for radio-frequency characterization at multiple frequencies.

Aerogel and other substance portions used in conjunction with aspects herein can undergo additional preparation before examination, testing and fabrication. For example, materials can be outgassed at temperature (e.g., 80° C.) for a period of time (e.g., 8 hours) under vacuum before an aspect is evaluated (e.g., nitrogen-absorption porosimetry).

Analysis and inspection of aerogel samples can be conducted in a variety of ways. Microscopes, including scanning electron microscopes, can be employed to imaging metallized portions (e.g., after sputter coating) of aerogel substrates. Porosity can be analyzed using surface area and pore distribution analyzing equipment. Skeletal density and bulk density can be evaluated by techniques including helium pycnometry. Compression, tensile and other mechanical tests can be performed using various load frames and associated software packages. Compression testing can include the use of compression platens, which can be coated with graphite lubricant to reduce surface friction and barreling. Infrared spectroscopy, thermal gravimetric analysis, and other techniques can also be employed to develop and evaluate aerogels and other materials herein.

Permittivity testing of aerogels can be conducted with different specimen geometries for different frequency bands. In an example, geometries can range from approximately W=1.5 cm, H=1.5 cm and T=0.25 cm for low frequency measurements (~5- to 1300 MHz) using the parallel plate capacitor set up, W=2.29 cm, H=1.02 cm, and T=0.74 cm for the X-Band (~8-12 GHz) waveguide transmission measurement set up, and W=0.35 cm, H=0.71 cm, and T=0.25 cm for the Ka-Band (26.5-40 GHz) waveguide transmission measurement set up, where W=width of the sample, H=sample height, and T=sample thickness.

As used herein, permittivity can include a measure such as ($\varepsilon_r = \varepsilon_r' \pm j\varepsilon_r''$), where $\varepsilon_r'$ is known as the relative dielectric constant of the material with respect to the permittivity of vacuum ($\varepsilon_0 = 8.85 \times 10^{-12}$ F/m). As used herein, loss tangent can include a measure such as ($\tan \delta = \varepsilon_r''/\varepsilon_r'$), where $\varepsilon_r'$ is known as the relative dielectric constant of the material with respect to the permittivity of vacuum ($\varepsilon_0 8.85 \times 10^{-12}$ F/m) and $\tan \delta$ is associated with the propagation losses of the material at RF frequencies. Percent porosity can be calculated using the equation (Porosity=$[1-\rho_b/\rho_s] \times 100\%$).

Dielectric constant can vary between aerogel formulations. For example, dielectric constant can be lower for aerogels made using BPDA as the dianhydride compared to those made with BTDA, and can decrease with increasing DMBZ fraction. With some formulations, relative dielectric constant can increase in a predictable fashion (e.g., linearly) with density independent of the polyimide backbone chemistry. Mean loss tangent can also decrease with increasing DMBZ fraction. Loss tangent can also increase predictably (e.g., linearly) with increasing density in some frequency bands.

Figure 1B:
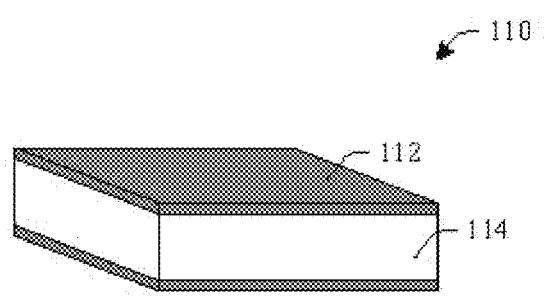

Referring initially to FIGS. 1A and 1B, illustrated is a sample diagram 100 and an example diagram 110 of metallized aerogel samples in accordance with some aspects herein. FIG. 1A shows one view of a sample diagram 100 of a metallized aerogel sample. Metallized aerogels can be used in, for example, aerogel-based antennas.

Sample diagram 100 depicts metallized surface 102 and substrate 104. Metallized surface 102 can be, for example, a layer of gold. Other metals with desirable properties can also be used. Metallization can be accomplished by techniques including, but not limited to, electron beam (hereinafter "e-beam") evaporation. E-beam metallization can be conducted in a vacuum chamber and permit vaporized metals such as gold to deposit on a substrate's surface. Other means for heating a coating metal, such as resistance heating (including flash evaporation), filament evaporation, or plasma heating, are possible as well. In at least one embodiment, metallized surface 102 is metallized using a sputtering technique. Embodiments employing sputtering techniques may be preferable for some applications for improved adhesion. Properly formed aerogel substrates can facilitate proper adherence and avoid compromising the pore structure or warping during metallization. Those skilled in the art will appreciate that additional techniques for creating one or more metallized portions (e.g., ink jet printing) can be utilized to create at least a portion of metallized surface 102, alone or in combination with other techniques described herein.

Substrate 104 can be an aerogel. In some embodiments, substrate 104 can be a polyimide aerogel. Other polymers can be used in the fabrication of aerogels for use as substrate 104, provided the resulting aerogel falls within a desired (typically low) density range, exhibits the desired (typically low) dielectric constant range, and delivers the desired mechanical and electromagnetic properties when metallized. In some embodiments, in addition or alternative to polyimide aerogels, polyimide-polyurea aerogels cross-linked with aromatic triamine (TAB) can be employed. Aerogels can be made using two different dianhydrides or mixtures of two diamines. Various formulations can be fabricated for low frequency (e.g., around 50 MHz), L-Band (e.g., around 1.4 GHz), and X-Band (e.g., around 12 GHz) applications. Other formulations can be designed to support a variety of other frequencies (e.g., ultra-high frequency from 300 MHz to 3 GHz, Ka-Band from 26.5-40 GHz, and above).

Example diagram 110 shows a metallized aerogel sample. It is to be appreciated that the diagram is for illustrative purposes only, and not necessarily drawn to scale. Diagram 110 includes metallized surface 112 and substrate 114. As with the above, metallized surface 112 can be, for example, gold deposited by e-beam or sputtering. In some embodiments, other metallization techniques are employed. Substrate 114 can be, but is not limited to, polyimide aerogels. In some embodiments, the metal coating can range between 200 nm and 2 μm thickness. Metallized surface 112 can take on a variety of patterns, and need not uniformly cover (or cover at all) some or all of substrate 114. In some embodiments, different layers can be added to metallized surface 114. In some embodiments, a plurality of metals, or metal alloys, can be applied to metallized surface 114.

Metallized aerogels like those shown in the samples of FIGS. 1A and 1B can be used in, for example, new antenna designs. Such designs can deliver a substantial weight savings over conventional antennas that employ structural materials with dramatically higher density than aerogels. For example, many antennas are constructed entirely of metal. In other antenna designs, metal comprises the bulk of the mass, but other metal, plastic, or rubber shells are included on or around the functional portion of the antenna. Aluminum and copper, two materials commonly found in antennas, have densities of 2.7 g/cm$^3$ and 8.96 g/cm$^3$, respectively. Polyimide aerogels can be designed to have densities ranging, for example, between 0.1 g/cm$^3$ and 0.25 g/cm$^3$. While a metallized polyimide aerogel sample can have an average density slightly higher than a non-metallized sample, the overall density remains at least an order of magnitude lower than materials traditionally used in antennas. By utilizing antennas in accordance with disclosures herein, many platforms can reduce the mass associated with antennas by a factor of five or more.

Aerogels can also provide superior environmental stability. The thermal conductivity and physical structure of the aerogels described herein give them enhanced survivability over denser materials in a variety of extreme temperatures and environments. In addition, the porous nature of aerogels improves their performance at altitude or in space, as warping and out-gassing are resultantly minimized. In particular, polyimide aerogels have superior mechanical strength and can be easily fabricated.

Aerogel-based antennas can also be designed to exhibit particular electrical properties, based upon predetermined ranges of transmittivity, reflectivity, permittivity, and path loss of the aerogel substrates. The low dielectric permittivity associated with aerogels can contribute to minimize radio frequency (RF) losses, improved impedance matching, and enhance the gain of antennas. Furthermore, robust, lightweight aerogels can facilitate the design of wider bandwidth antennas. By using conformal antennas with electrical properties appropriate for a variety of purposes (e.g. antenna designed with operational bandwidth wider than current systems), the number of antennas on some systems can be reduced by a factor of three or more.

Several applications for such antennas can be appreciated in view of the disclosures herein. Both private and governmental aerospace efforts can design new systems and improve existing ones around aerogel-based antennas. The weight and complexity added to large aircraft by antennas associated with various Tx/Rx suites is substantial, and can weaken the structural integrity of (for example) a fuselage by requiring more and larger discontinuities (e.g., apertures or inlets) and unbalanced protrusions. While smaller aircraft can benefit from the same types of systems employed on larger airframes, the size and weight of such systems is often prohibitive. Aerogel based antennas can offer weight savings, be flexibly placed in previously untenable positions on an airframe, and can be designed to accommodate multiple systems (e.g., wider bandwidth permits use of the same antenna for a variety of applications such as data transmission, navigation and voice communications), thus reducing the total number of antennas in flight. By customizing the shape of an aerogel-based antenna or using a flexible/non-rigid aerogel substrate, antennas can be designed to shape or wrap to a particular aircraft feature, or can otherwise be made conformal to one or more parts of an aircraft (e.g., portion of wing, side of tail, curve of fuselage) to reduce drag. Aircraft can accordingly carry additional electronics, heavier payloads, extend flight time or improve aerodynamic properties by utilizing such antennas. These benefits are useful in all varieties of airborne vehicles, including spacecraft, satellites, jets, prop planes, ultralights, unmanned vehicles, rockets, missiles, and others.

While some aspects herein are focused toward aerospace applications, it is intended to be understood that a variety of other applications are possible. The performance, flexibility and portability of aerogel-based antennas will improve ease of use and efficiency in ground vehicles, man-packed equipment, and other mobile applications. Even in static applications, such as a fixed retransmission station, aerogel-based antennas can be utilized to minimize cost and maintenance burden while maximizing performance and environmental stability. Further, the light weight of aerogel-based antennas makes their transportation and setup less burdensome than comparable techniques associated with traditional antennas used to facilitate a Tx/Rx scheme at static locations. Additionally, small, high-volume antennas such as those used in RFID tags or wearable medical devices can be improved through implementing aerogel-based antennas.

Figure 2:
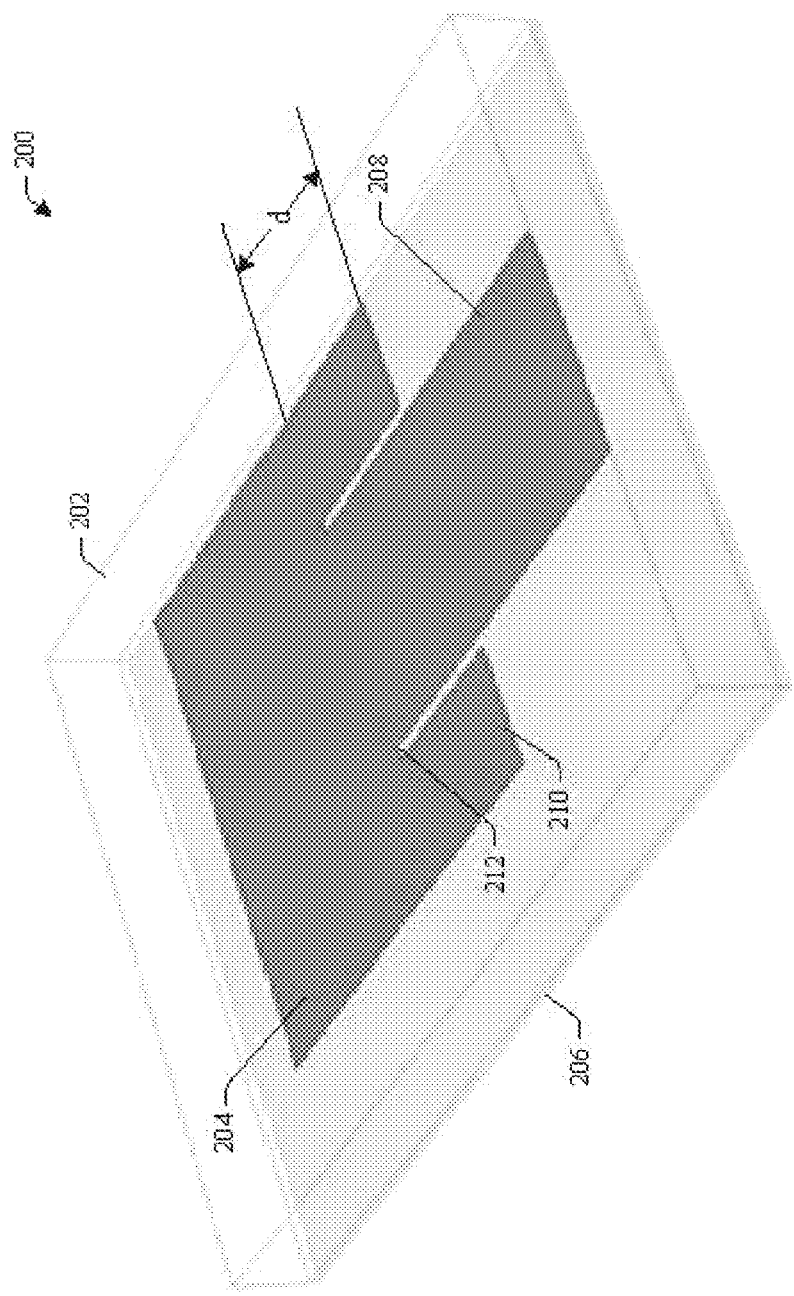
FIG. 2 illustrates a diagram of a schematic of a printed circuit patch antenna in accordance with some aspects described herein.

Turning now to FIG. 2, illustrated is a diagram of a schematic of a printed circuit patch antenna 200 in accordance with some aspects described herein. In some embodiments, printed circuit patch antenna 200 can be a broadband planar patch antenna fabricated with an aerogel substrate. The use of aerogels in planar patch antennas can facilitate wider operational bandwidth, reducing the number of antennas needed to support a particular set of systems. In some embodiments, the printed circuit patch antenna can, but need not, be square-shaped.

Printed circuit patch antenna 200 can include aerogel substrate 202, patch antenna 204, and ground plane 206. The patch antenna 204 illustrated in FIG. 2 is a rectangular patch antenna, however, the shape of the patch antenna can be any shape, such as but not limited to, square, triangular, fractal, planar, spiral, etc. Thus, the embodiment described herein and illustrated in FIG. 2 is for illustrative purposes only and is not intended to limit the scope of the innovation. A microstrip transmission line 208 is provided to feed the patch antenna 204. In order to obtain a desired impedance for the patch antenna 204, a connection point (or feed point) of the transmission line 208 and the patch antenna 204 can be adjusted. For example, the transmission line 208 can connect anywhere between an edge 210 of the patch antenna 200 to any point 212 inset a distance d from the edge 210, as shown in the example embodiment in FIG. 2.

Metallization of printed circuit patch antenna 200 can be performed on both sides, with one side serving as ground plane 206 and the other as printed circuit antenna 204. Printed circuit antenna 204 can have its pattern transferred via metallization by using, for example, a physical mask with the desired antenna design during evaporation or by using standard lithography method (e.g., chemical etching), or even dry-etching (e.g., ion etching). Other means for creating the desired antenna geometry, by way of metallization or other techniques, will be appreciated by the skilled artisan in view of the disclosures herein.

Printed circuit patch antenna 200, based on an aerogel substrate, can realize up to 10 times the bandwidth at one-tenth the weight when compared to non-aerogel-based antennas designed with the same geometry at the same operational frequency on commercially available substrates (e.g., Rogers Duroid®).

In some embodiments, a plurality of printed circuit patch antenna fabricated at least in part utilizing aerogels can be combined into an array. The large operational bandwidth of aerogel-based printed circuit patch antenna 200 provides a basis for lightweight antenna arrays. Not only are the individual antennas among the array lighter, but fewer are required to provide similar array function. In some embodiments, printed circuit patch antenna 200 can be one antenna within a phased antenna array. Adaptability, affordability and light weight make printed circuit patch antenna 200 highly suitable as a "building-block" element in complex antenna arrays.

In some embodiments, printed circuit patch antenna 200 include aerogel substrate 202 fabricated using a polyimide aerogel formulation made from 100% DMBZ and BPDA. A metallic circuit, patch antenna 204, can be printed to the dielectric substrate. In some embodiments, the metallic circuit can be a thin (e.g., 2 µm) metal (e.g., gold) film. Other materials and thicknesses will be apparent to those skilled in the art. Patch antenna 204 can be printed via electron beam evaporation and a shadow masking process as well as any other physical and/or chemical pattern printing process compatible with the aerogel material. Ground plane 206 can be produced by coating the non-circuit side of aerogel substrate 202 with a film of electron-beam evaporated metal (e.g., gold).

Figure 3:
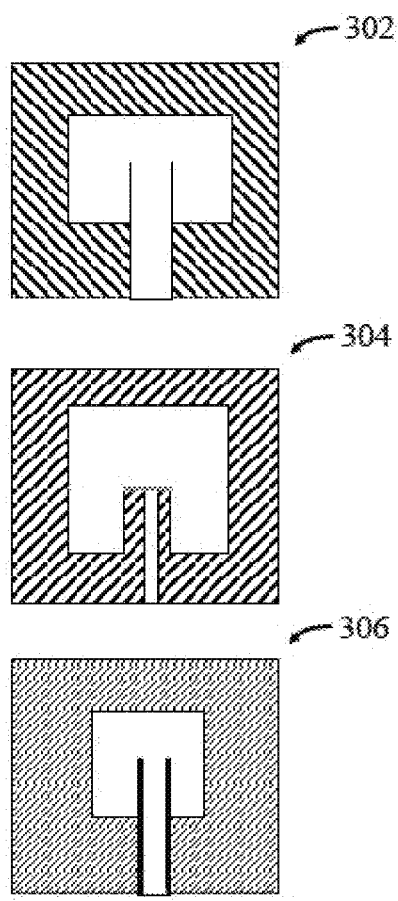
FIG. 3 illustrates diagrams of samples of printed circuit patch antennas in accordance with some aspects herein.

FIG. 3 illustrates diagrams 302, 304, and 306 of samples of printed circuit patch antennas in accordance with some aspects herein. Diagram 302 depicts a patch antenna on a polyimide aerogel substrate in accordance with disclosures herein. Diagrams 304 and 306 depict antennas on alternative substrates such as those represented in graphs described infra.

The samples depicted in FIG. 3 can be fabricated, for example, from molds. In at least one embodiment, a silicone mold can be used to produce an aerogel portion. Exact sizing of aerogel substrate "blanks" can be accomplished by sanding, cutting, or others techniques suitable for manipulating aerogels. In some embodiments, the aerogel portion is ready for fabrication as-made. In other embodiments, larger aerogel pieces, or pieces requiring refinement or customization can be developed for use.

Figure 4:
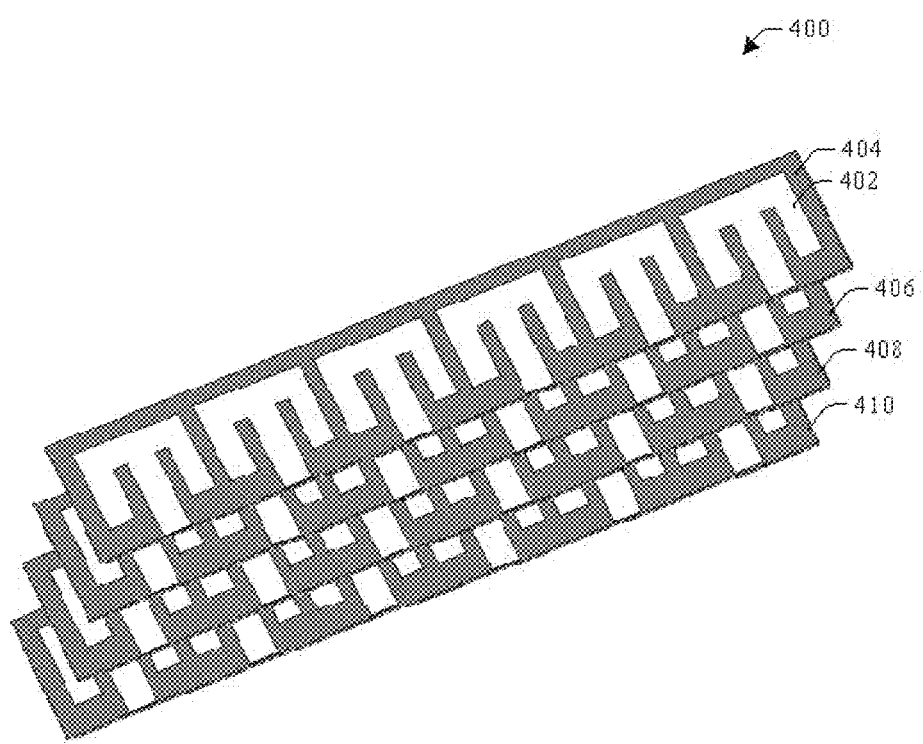
FIG. 4 illustrates a sample diagram of at least a portion of an array comprising a plurality of antenna in accordance with one or more aspects disclosed herein.

Turning now to FIG. 4, illustrated is a sample diagram of at least a portion of an array 400 comprising a plurality of antenna in accordance with one or more aspects disclosed herein. Array 400 can include sub-arrays 404, 406, 408 and 410. Sub-arrays 404, 406, 408 and 410 can include a substrate board on which antenna 402 and several similar antennas are included. In one or more embodiments, a substrate board can be made of an aerogel. In some embodiments, each antenna exists on its own substrate board, which are linked after individual fabrication. In alternative embodiments, a single substrate portion can be used for a plurality of antennas. In some embodiments, the entire underside of a substrate board can be metallized as a ground plane. Various sub-arrays 404, 406, 408, 410, and others, can then be operatively coupled to complete an antenna array, such as a phased array antenna.

Figure 5:
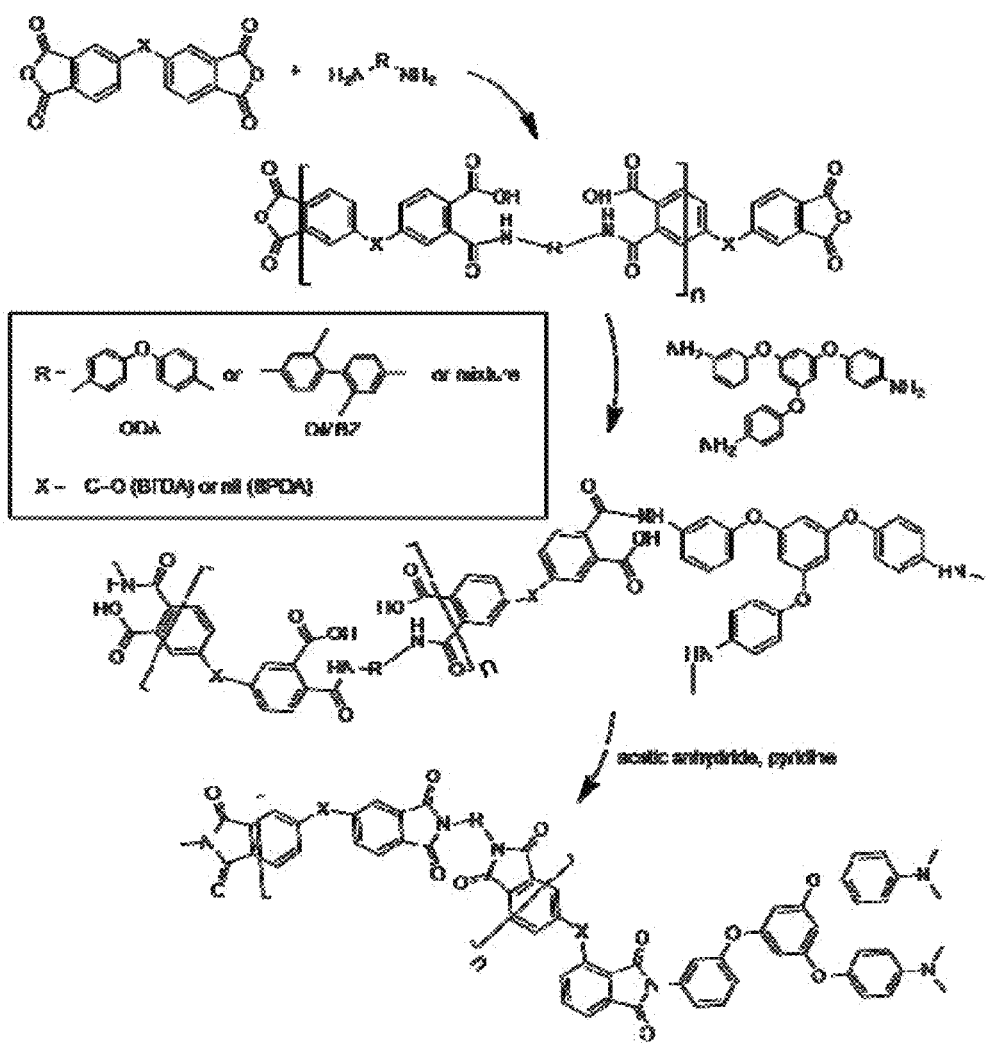
FIG. 5 illustrates example synthesis of polyimide aerogels with 1,3,5-triaminophenoxybenzene (TAB) cross-links.

Turning now to FIG. 5, illustrated is an example synthesis of polyimide aerogels with TAB cross-links.

Figure 6:
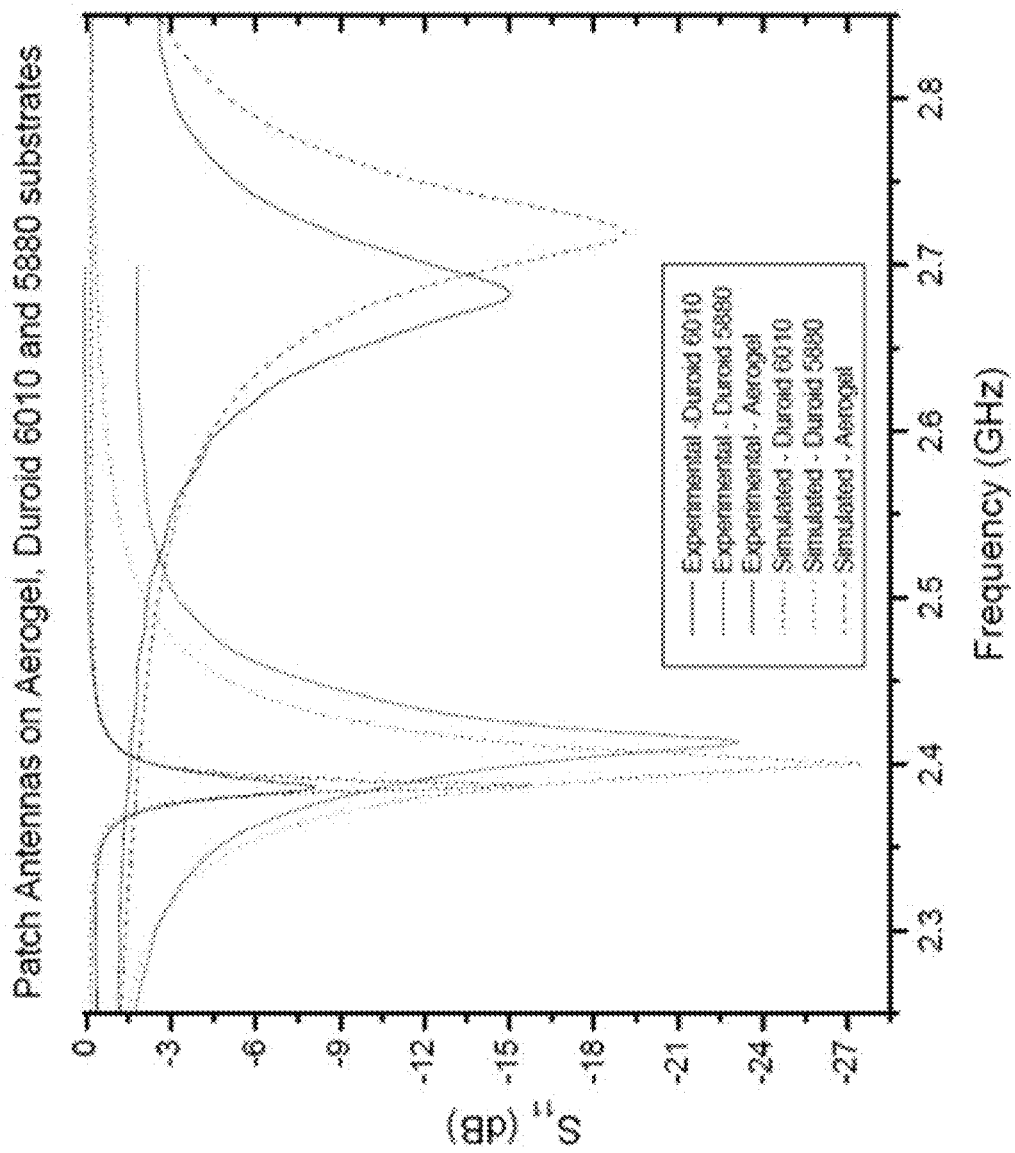
FIG. 6 illustrates a sample graph plotting experimental and simulated performance of patch antennas fabricated on aerogel and commercially available substrates.

Turning now to FIG. 6, illustrated is a sample graph plotting performance of experimental and simulated data for the patch antennas on aerogel and commercially available substrates (i.e., Rogers Duroid®). A reflection scattering parameter ($S_{11}$) is plotted in decibels against frequency. The different curves depict experimental and simulated results for an antenna with a polyimide aerogel substrate, and two antennas fabricated on commercially-available, non-aerogel substrates. The scattering parameter can be measured with, for example, a vector network analyzer for RF analysis. As shown, the experimental and simulated data correlates, and the aerogel-based antenna exhibited a broader bandwidth with lower mass.

TABLE 1

Comparison of RF and physical parameters of aerogel-based patch antennas and patch antennas based on commercial products

| Antenna substrate | Dielectric constant | 3 dB Bandwidth (MHz) exp/sim | 10 dB Bandwidth (MHz) exp/sim | Substrate dimensions l/w/h (cm) | Patch dimensions L/W (cm) | Mass (g) |
|---|---|---|---|---|---|---|
| Duroid 6010 | 10.2 | 16.8/22.1 | —/5.6 | 5.56/3.98/0.61 | 1.95/1.95 | 4.30 |
| Duroid 5880 | 2.2 | 159/192 | 50.3/57.4 | 8.31/6.52/0.32 | 4.09/4.09 | 36.45 |
| PI aerogel | 1.16 | 218/255 | 62.1/71.2 | 8.82/6.88/0.41 | 4.80/4.80 | 4.18 |

Figure 7A:
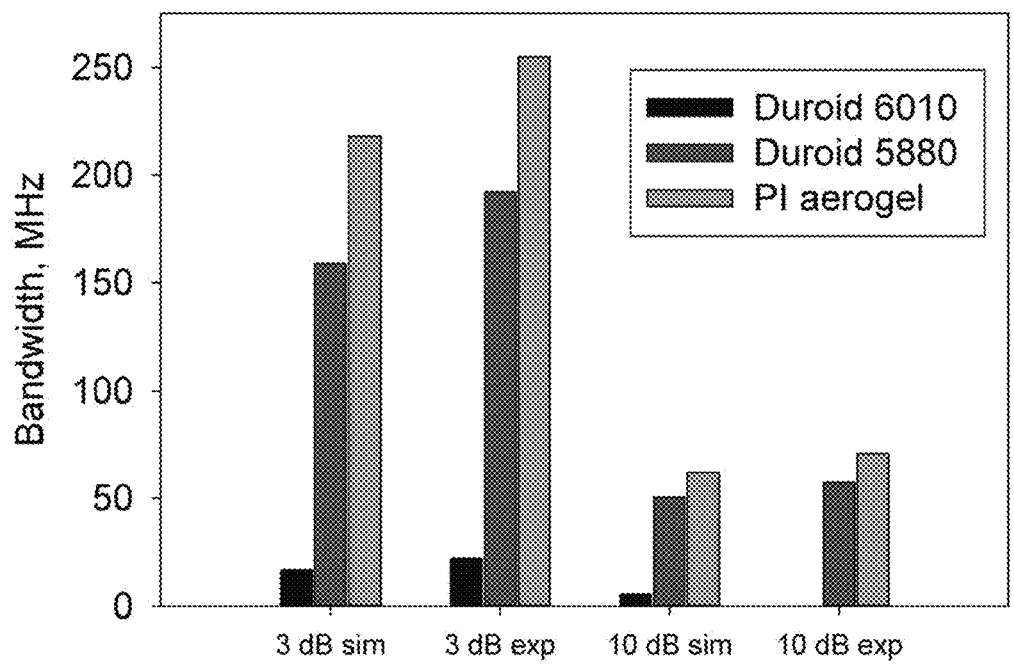
FIGS. 7A-7B illustrate sample charts showing bandwidth and mass comparisons far path antennas fabricated on aerogel and commercially available substrates.
Figure 7B:
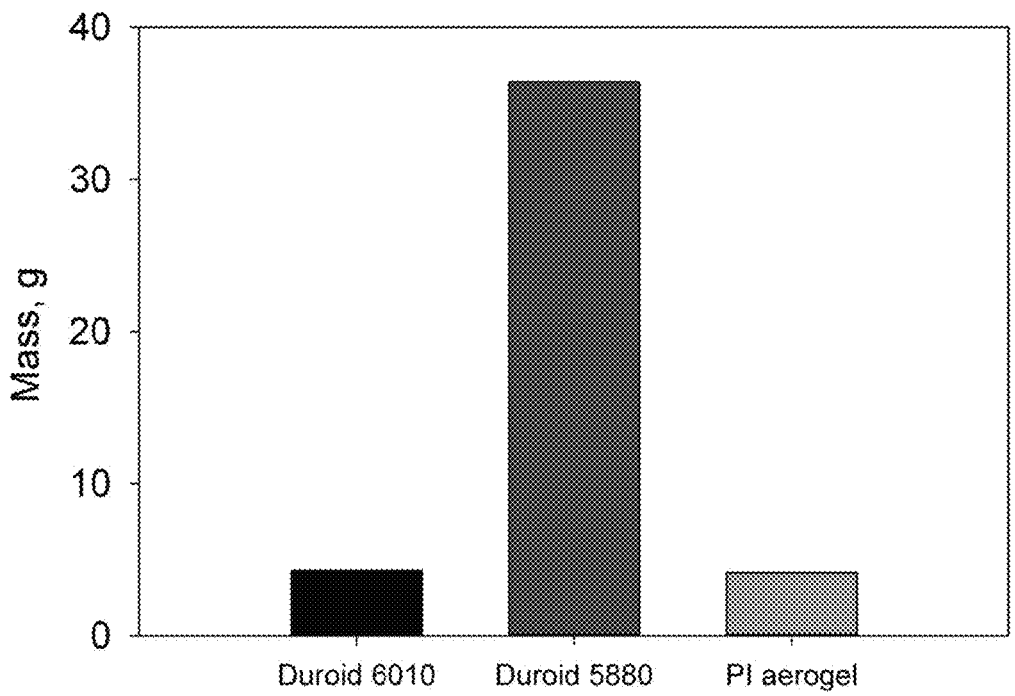

FIGS. 7A-7B illustrate sample charts showing bandwidth and mass comparisons for path antennas fabricated on aerogel and commercially available substrates. The charts show greater bandwidth at lower mass in the PI aerogel compared to the commercial substrates.

Figure 8A:
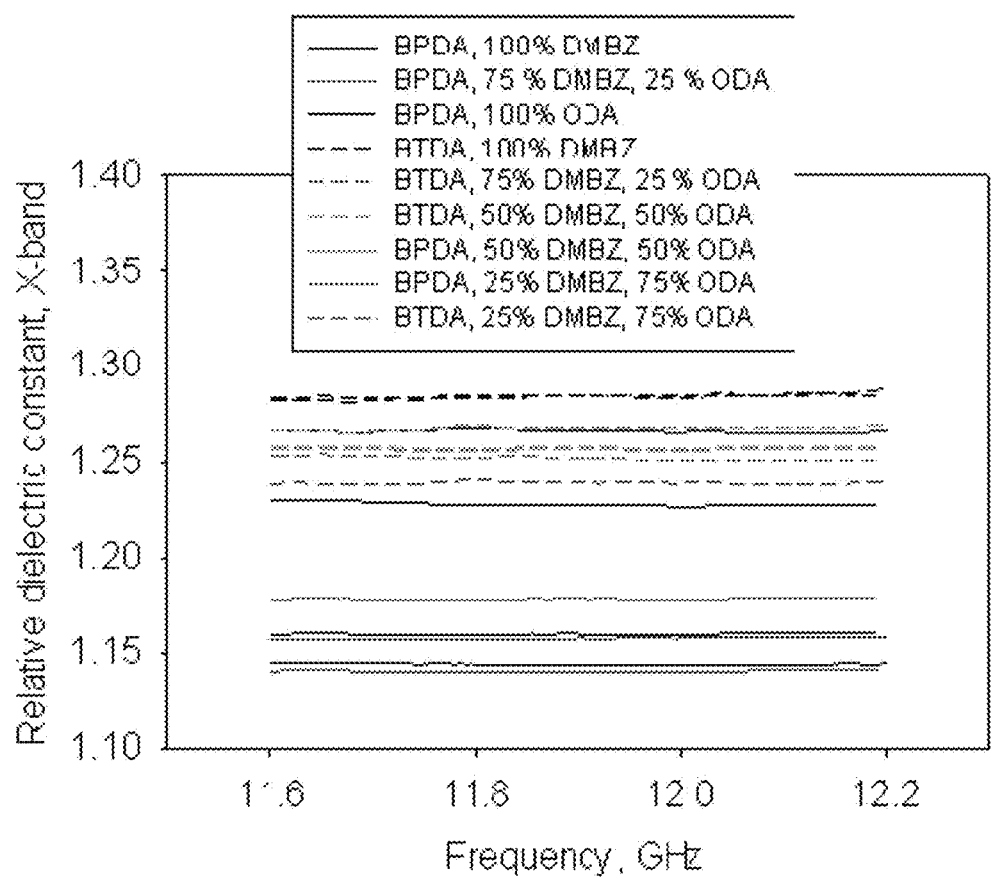
FIGS. 8A-8C illustrate sample graphs plotting dielectric constant for various aerogel formulations.
Figure 8B:
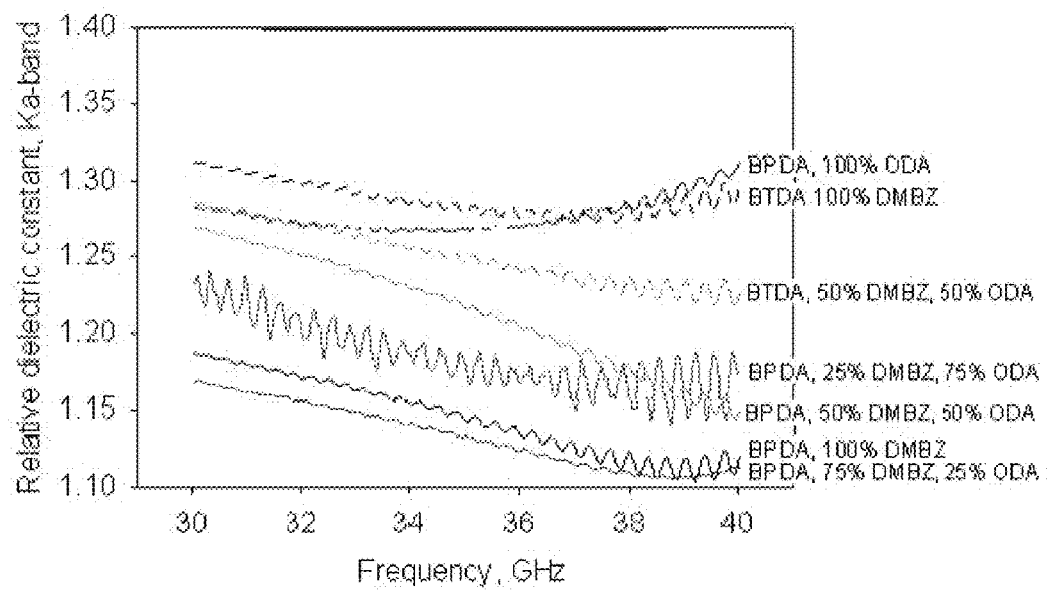
Figure 8C:
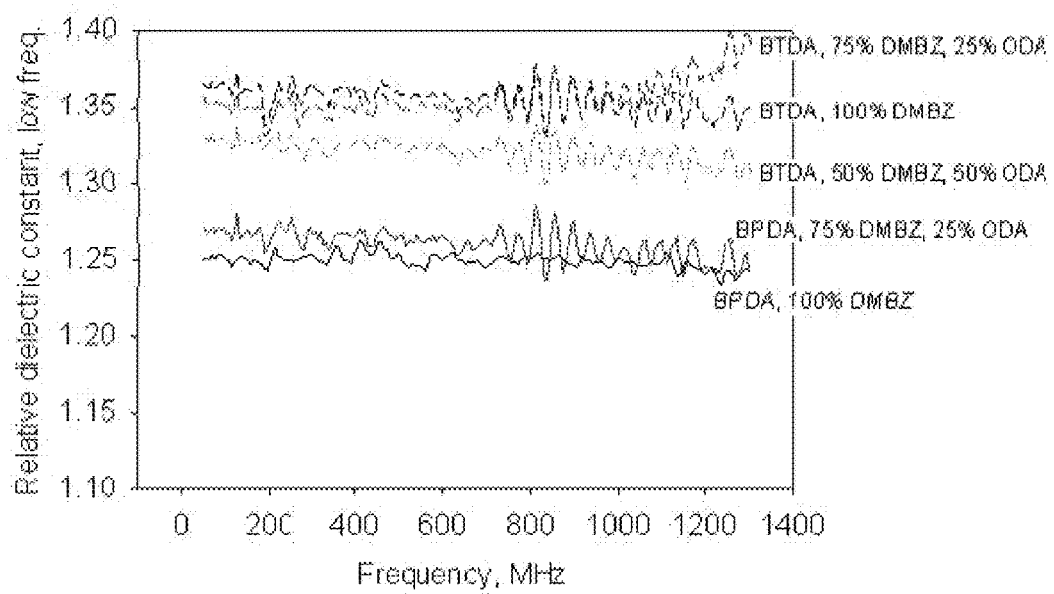

FIGS. 8A-8C illustrate sample graphs plotting dielectric constant for various aerogel formulations across a frequency spectrum. While the precise formulations for each and every sample are not described, FIGS. 8A-8C illustrate that the dielectric constant is experimentally consistent at various frequencies for a given formulation. FIGS. 8A-8C also shows a sample distribution of possible dielectric constant using aerogels in accordance with the disclosures herein. The formulation labeled BN10-31 can be made from 2,2'-dimethylbenzidine (DMBZ), biphenyl-3,3',4,4'-tetracarboxylic dianhydride (BPDA) and TAB. BN10-31 has a particularly low dielectric constant, excellent mechanical properties at the lowest density, and good resistance to moisture.

Figure 9A:
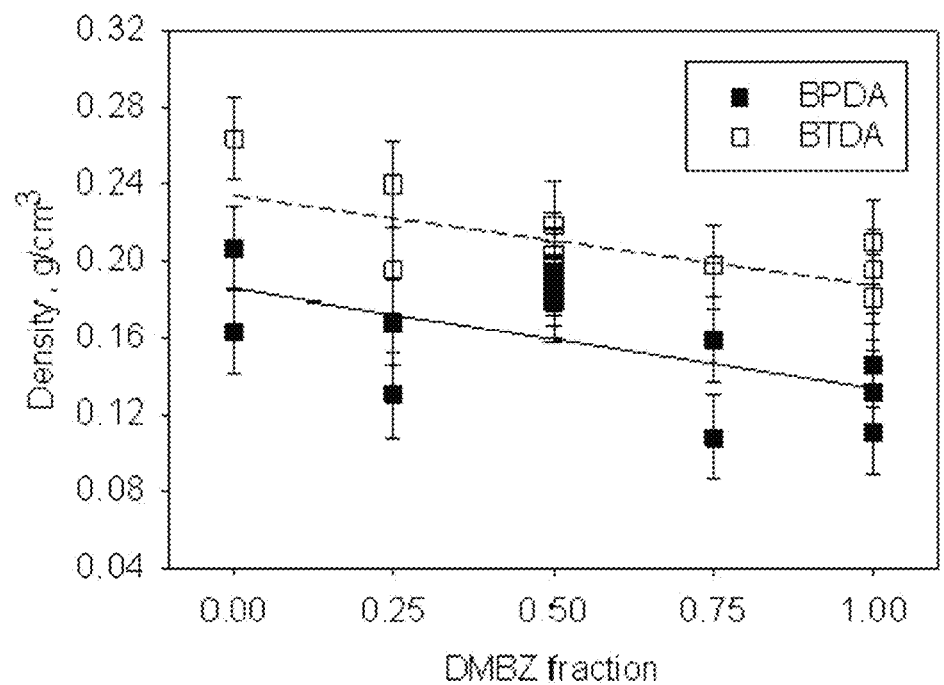
FIGS. 9A-9B illustrate sample graphs plotting density and compressive modulus at different 2,2'-dimethylbenzidine (DMBZ) fractions.
Figure 9B:
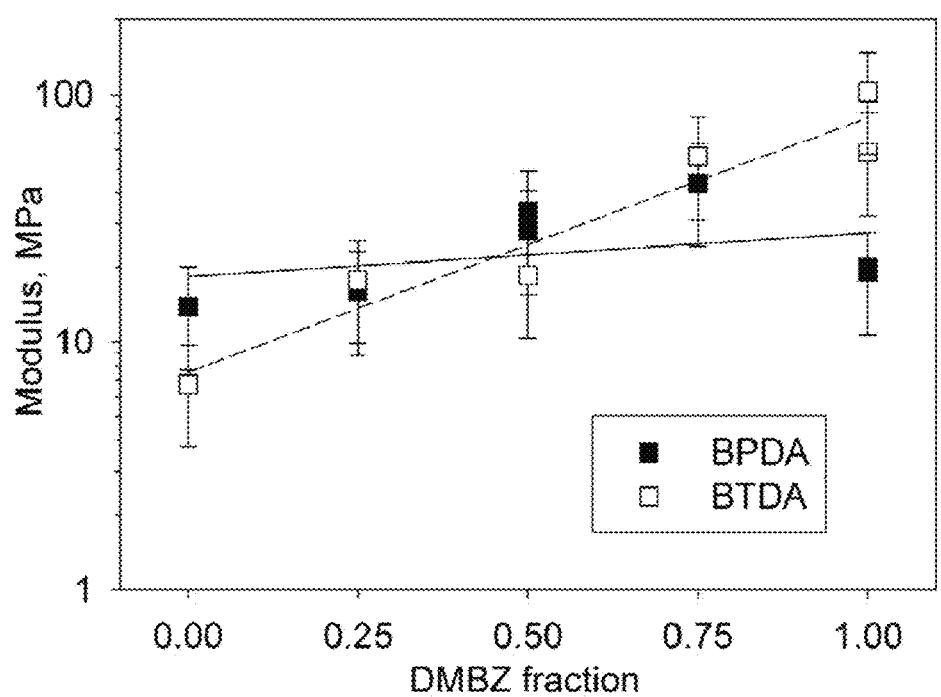

FIGS. 9A-9B illustrate sample graphs plotting density and compressive modulus as influenced by DMBZ fraction in aerogel formulation. Increasing compressive modulus and decreasing density generally correspond to the overall trend lines as DMBZ fraction increases.

Figure 10A:
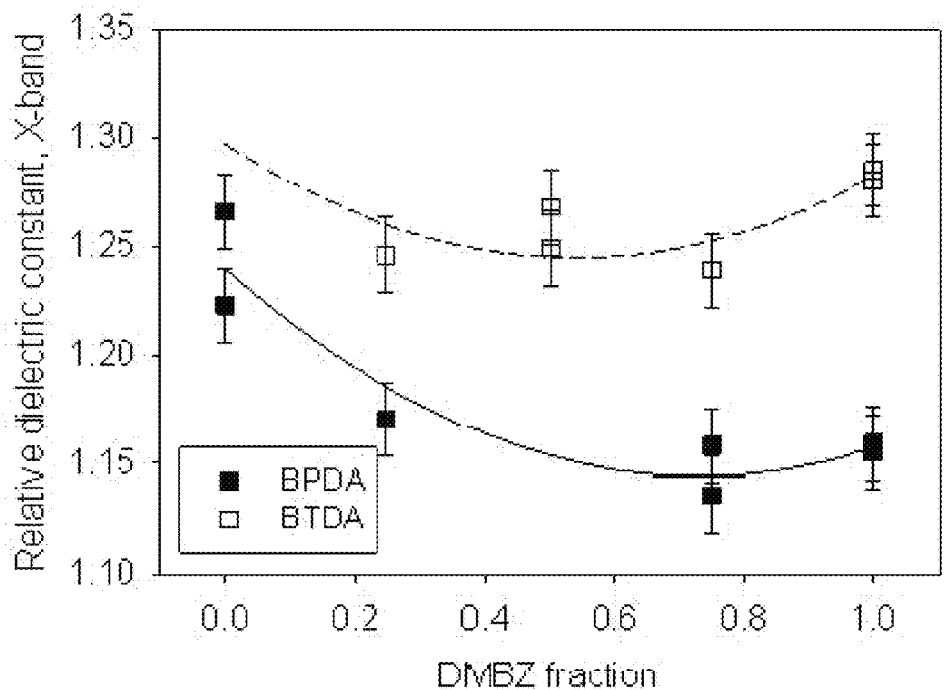
FIGS. 10A-10B illustrate sample graphs plotting dielectric constant and mean loss tangent at different DMBZ fractions.
Figure 10B:
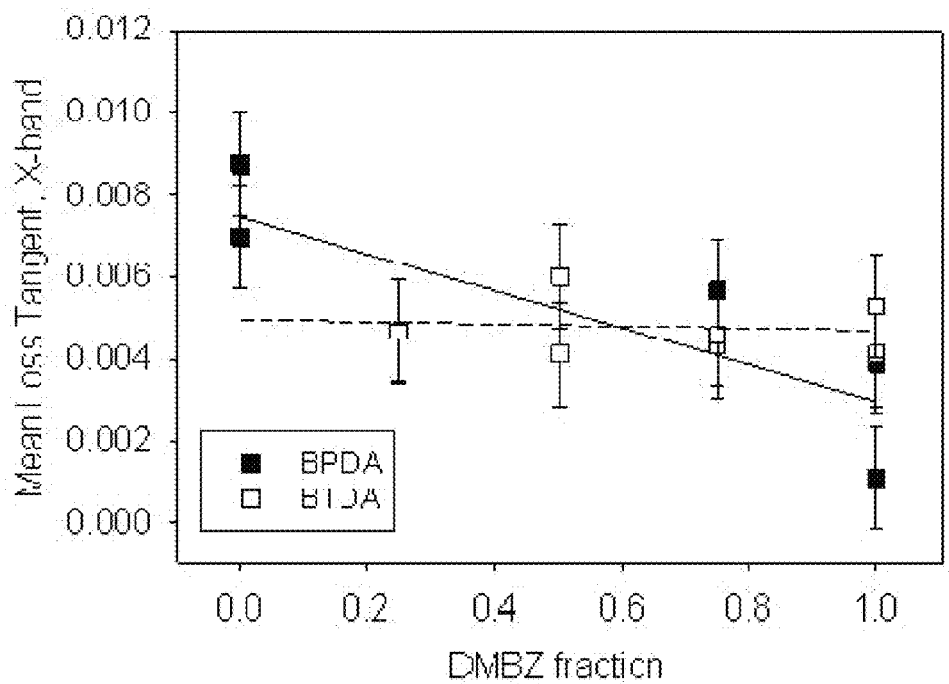

FIGS. 10A-10B illustrate sample graphs plotting relative dielectric constant and mean loss tangent as influenced by DMBZ fraction in aerogel formulation. The depicted example plottings are focused in the X frequency band. Increasing DMBZ fraction results in a curve where the relative dielectric constant in the X-band decreases until DMBZ fraction is in the vicinity of 50%, then increases slightly to 100%. The mean loss tangent in the X-band generally trends downward with increasing DMBZ fraction.

Figure 11A:
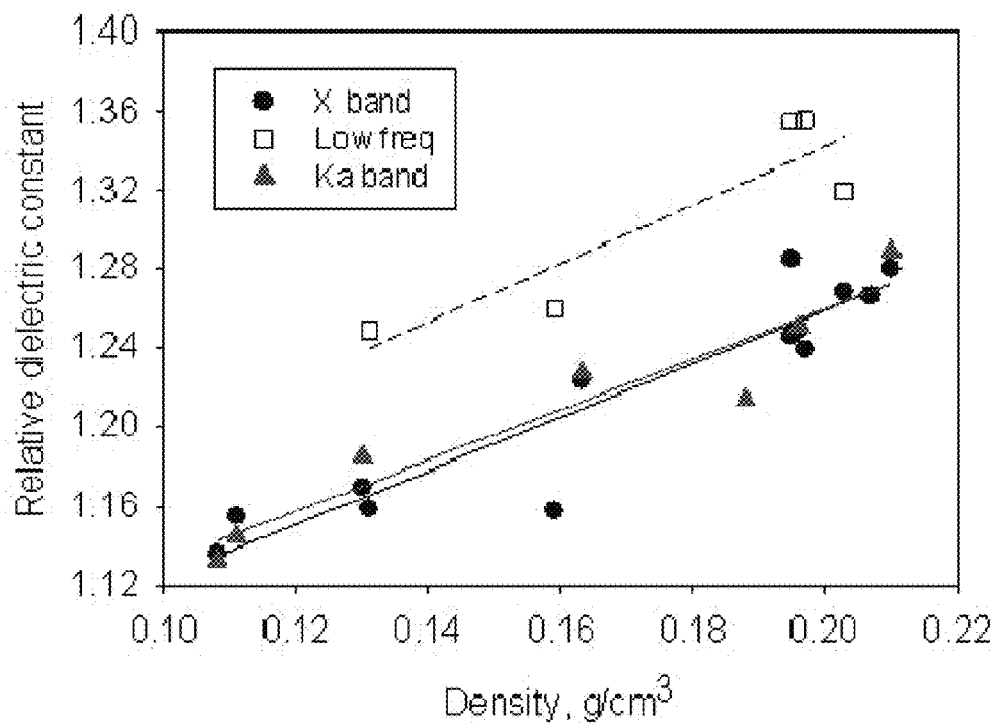
FIGS. 11A-11B illustrate sample graphs plotting dielectric constant and loss tangent for aerogels as a function of density and within different frequency ranges.
Figure 11B:
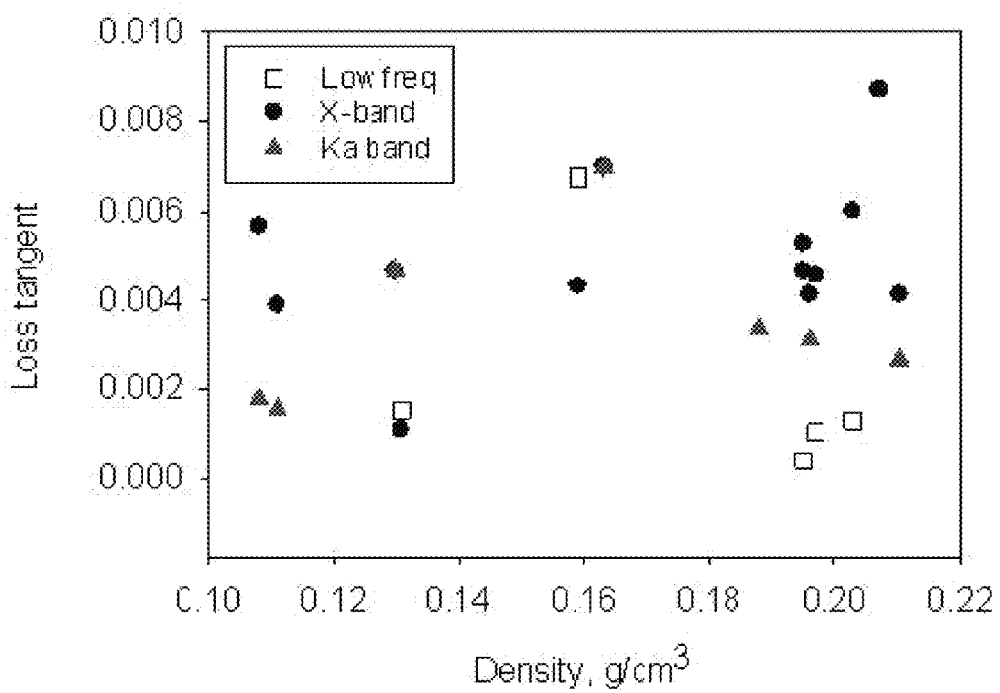

FIGS. 11A-11B illustrate sample graphs plotting dielectric constants and loss tangents of aerogels by density. As shown, the dielectric constants roughly track density (e.g., the two increase together), and loss tangents are relatively comparable within a given frequency range.

Figure 12A:
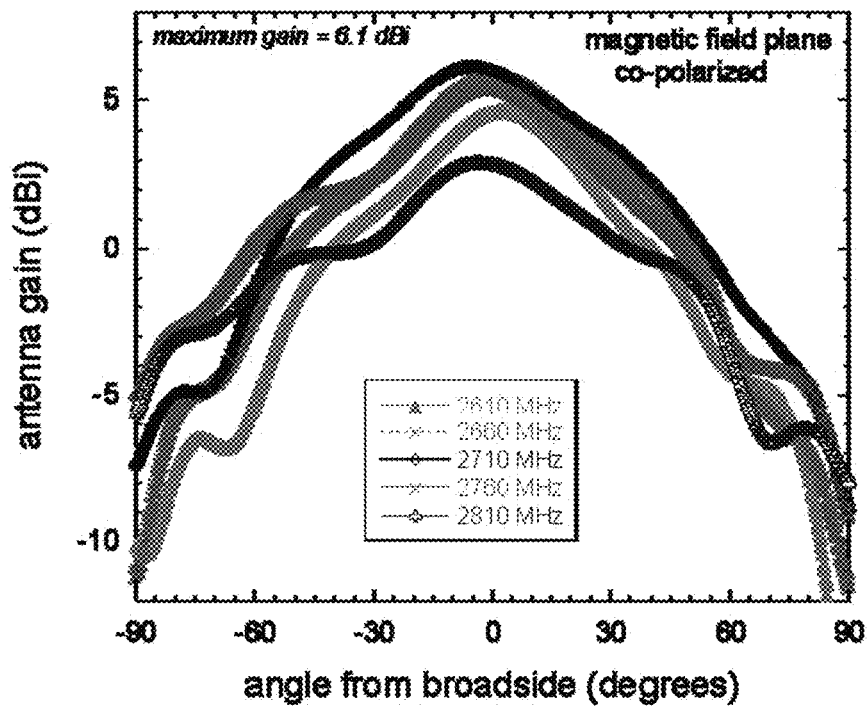
FIGS. 12A-12C illustrate sample graphs plotting antenna gain against angle at various frequencies.
Figure 12B:
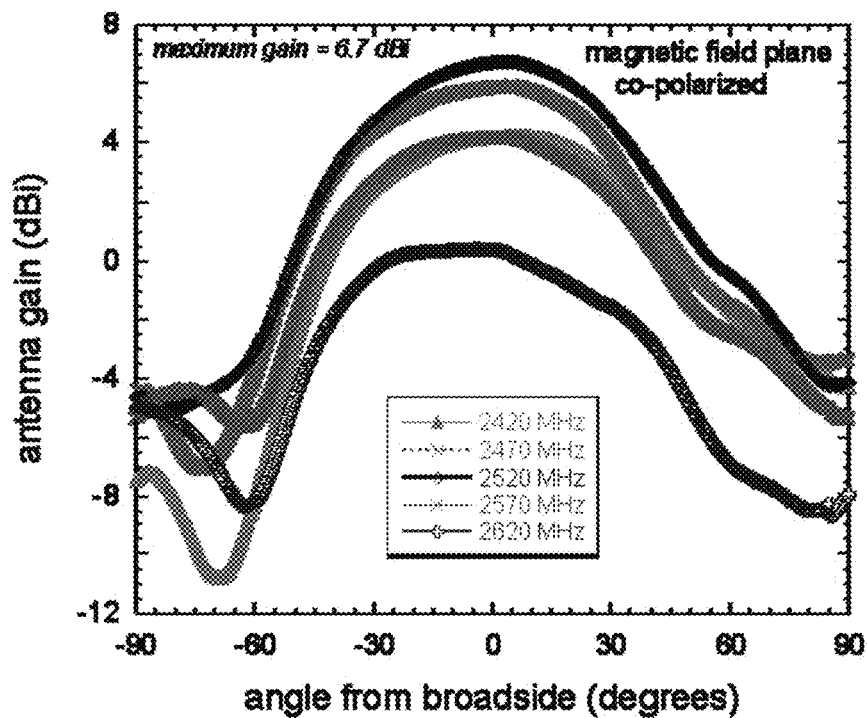
Figure 12C:
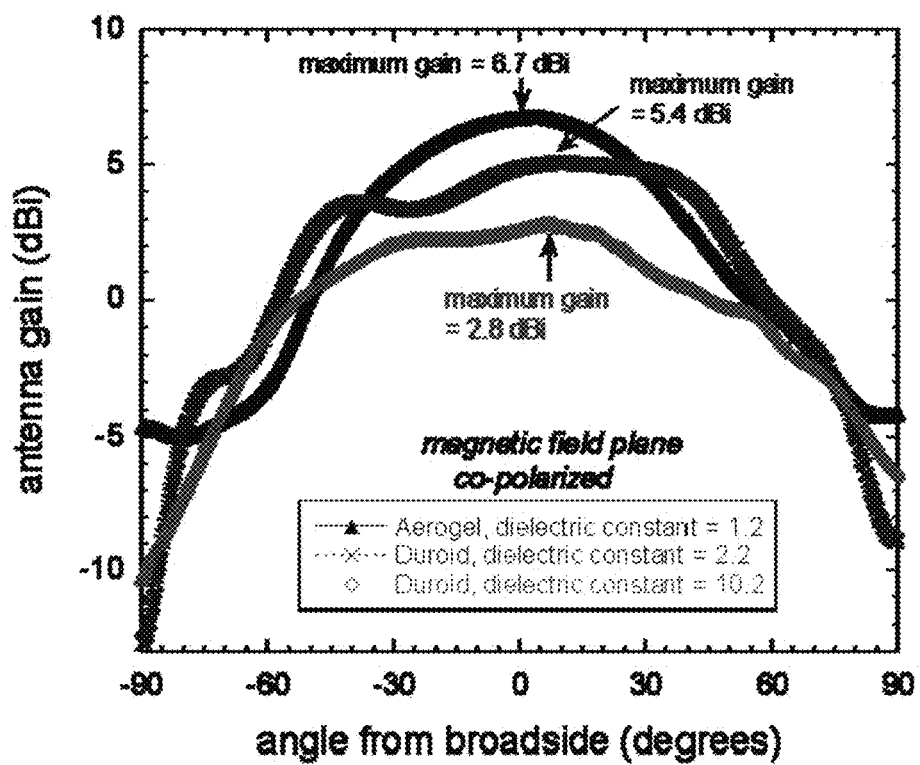

FIGS. 12A-12C illustrate sample graphs plotting antenna gain against angle at various frequencies.

While the disclosures herein have focused on the use of aerogels as a substrate or structural material in antennas, it is intended to be understood that aerogels, and particular polyimide aerogels or analogous materials exhibiting similar properties to those described herein, can be used in a variety of other applications. Various other electronic components, such as printed circuit boards and various other computer modules, can realize many of the benefits expressed or implied herein by utilizing aerogels. Further, aerogels can be used as a purely structural material, detached from any Tx/Rx or electrical/electronic application.

In addition to those described above, additional formulations of cross-linked polyimide aerogels can be used in conjunction with aspects herein. In some embodiments, combinations of rigid and flexible aromatic diamines can be used to tailor the properties of octa(aminophenyl)-silsesquioxane (OAPS) cross-linked polyimide aerogels. OAPS can be procured as a mixture of isomers (e.g., meta:ortho:para=60:30:10). In some examples, 2,2'-dimethylbenzidine (DMBZ) or p-phenylenediamine (PPDA) can be used in combination with the more flexible diamine, 4, 4'-oxydianiline (ODA). The amount of rigid diamine can vary from 0 to 100% of the total diamines in the backbone. Such formulations can provide additional control over density, shrinkage, porosity, surface area, and mechanical and thermal properties depending on the types and proportions of diamine employed. Replacing ODA with PPDA can increase shrinkage occurring during gelation and processing, while increasing the DMBZ fraction decreases shrinkage. Replacing ODA with 50 mol % of DMBZ can maintain the flexibility of thin films while improving the moisture resistance of the aerogels.

In preparing OAPS cross-linked polyimide aerogel monoliths, Poly(amic acid) oligomer can be formulated in NMP using a molar ratio of dianhydride to total diamines of 26 to 25 to provide oligomers with an average of 25 repeat units terminated with anhydride. The mole percent of rigid diamine in place of ODA can range from 0 to 100%. A ratio of four oligomers to one OAPS can be used as each OAPS contains eight amine groups which can react with the two terminal anhydride groups on the poly(amic acid) oligomers. The total weight of precursors in solution can be formulated to be 10 w/w % in embodiments.

A sample procedure for an oligomer made using 50% DMBZ and 50% ODA is as follows: To a stirred solution of DMBZ (0.443 g, 2.09 mmol) and ODA (0.418 g, 2.09 mmol) in 17 mL NMP can be added BPDA (1.278 g, 4.34 mmol). The mixture can be stirred until all BPDA is dissolved, and a solution of OAPS (0.0481 g, 0.042 mmol) in 2.145 mL NMP can be added. The resulting solution can be stirred for 5 minutes, after which acetic anhydride (3.275 mL, 34.7 mmol) (which can scavenge water byproduct) and then pyridine (2.81 mL, 34.7 mmol) can be added, both representing an eight to one ratio to BPDA. The solution can be continually stirred for 10 minutes and then poured into a 20 mL syringe mold (2 cm in diameter), prepared by cutting off the needle end of the syringe and extending the plunger all the way out. The gels which can form within 30 minutes can be aged in the mold for one day before extracting into fresh NMP to soak for 24 hours to remove acetic acid and pyridine. The solvent within the gels can then be gradually exchanged to acetone in 24 hour intervals starting with 75% NMP in acetone, followed by 25% NMP in acetone and finally three more times with 100% acetone. The gels can be placed in a 1 L supercritical fluid extraction chamber in acetone, and washed with liquid $CO_2$ at approximately 100 Bar and approximately 25° C. in four two-hour cycles. The chamber can be heated to 45° C. and the $CO_2$ converted into a supercritical state. Gaseous $CO_2$ can be slowly vented out at the rate 4.5 m/h from the chamber over three hours. In embodiments, the dry polyimide aerogels produced in this way can have a density of 0.095 g/cm$^3$ and porosity of 93.7%. 13C CPMAS NMR (ppm): 19.6, 124.3, 130.7, 143.9, 155, 165.9. FT-IR (cm$^{-1}$): 1775, 1715, 1596, 1498, 1417, 1370, 1236, 1170, 1112, 1088, 1008, 825, 736.

In some embodiments, polyimide aerogel films can be utilized. To make such films, the OAPS cross-linked polyamic acid solution as described above can be cast onto a poly(ethylene terephthalate) (PET) carrier using a 12 inch wide blade. Blade speed can be, for example, 80 cm/min. The gel film can be peeled away from the carrier film. Thereafter, the films can be washed in 24 hour intervals in 75% NMP in acetone, followed by 25% NMP in acetone, and finally washed three more times with acetone. Supercritical drying can performed in addition to the aforementioned procedures.

Additional aspects related to some polyimide aerogel formulations usable with aspects set forth herein can be observed in the table below.

TABLE 2

Polyimide Aerogel Properties

| Dianhydride | Diamine, % DMBZ | Density, g/cm$^3$ | Modulous, MPa | Dielectric constant, X | Loss tangent, X | Dielectric constant, LF | Loss tangent, LF | Dielectric constant, KA | Loss tangent, KA |
|---|---|---|---|---|---|---|---|---|---|
| BPDA | 0 | 0.207 | 13.9 | 1.266 | 8.74e−3 | — | — | — | — |
| BPDA | 0 | 0.163 | — | 1.2230 | 7.00e−3 | — | — | 1.227 | 7.00e−3 |
| BPDA | 0.25 | 0.130 | 16.0 | 1.1700 | 4.70e−3 | — | — | 1.185 | 4.71e−3 |
| BPDA | 0.75 | 0.159 | 43.7 | 1.158 | 4.33e−3 | 1.260 | 6.77e−4 | — | — |
| BPDA | 0.75 | 0.108 | — | 1.136 | 5.68e−3 | — | — | 1.133 | 1.78e−3 |
| BPDA | 0.50 | 0.188 | 33.9 | — | — | — | — | 1.214 | 3.37e−3 |
| BPDA | 0.50 | 0.195 | 28.1 | — | — | — | — | — | — |
| BPDA | 1.00 | 0.111 | 19.1 | 1.155 | 3.90e−3 | — | — | 1.145 | 1.57e−3 |
| BPDA | 1.00 | 0.131 | 20.1 | 1.159 | 1.10e−3 | 1.249 | 1.54e−3 | — | — |
| BTDA | 0 | 0.264 | 6.7 | — | — | — | — | — | — |
| BTDA | 0.25 | 0.195 | 17.8 | 1.246 | 4.69e−3 | | | | |
| BTDA | 0.50 | 0.196 | — | 1.249 | 4.13e−3 | — | — | — | — |
| BTDA | 1.00 | 0.210 | 102.3 | 1.280 | 4.13e−3 | — | — | 1.289 | 2.68e−3 |
| BTDA | 0.75 | 0.197 | 56.2 | 1.239 | 4.60e−3 | 1.356 | 1.04e−3 | — | — |
| BTDA | 0.50 | 0.203 | 18.6 | 1.268 | 6.02e−3 | 1.320 | 1.13e−3 | 1.320 | 1.30e−3 |
| BTDA | 1.00 | 0.195 | 58.4 | 1.285 | 5.30e−3 | 1.355 | 4.05e−4 | — | — |

Figure 13:
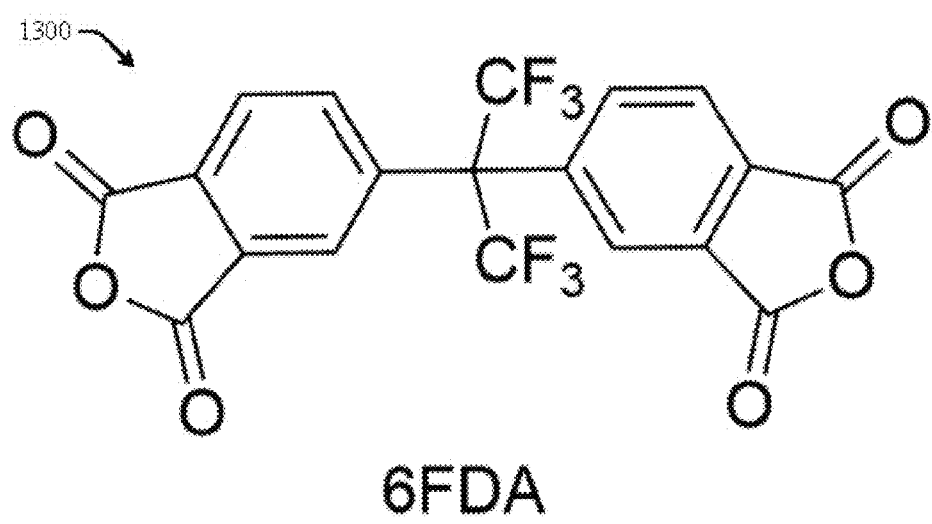
FIG. 13 is an illustration of dianhydrides (6FDA) used to create the aerogel in accordance with an aspect of the innovation.

Referring to FIGS. 13-28B, in an alternative embodiment, fluorinated dianhydride, 2,2-bis(3,4-dicarboxyphenyl) hexafluoropropane dianhydride (6FDA) 1300, shown in FIG. 13, is used in place of all or part of BPDA described above. Fluorinated monomers provide greater moisture resistance and possibly lower dielectric properties since fluorinated polyimides have lower dielectric constants than non-fluorinated backbone structures. Because of the lower reactivity of 6FDA, catalyst for chemical imidization had to be altered and optimized. Experiments were performed to optimize the effect of 6FDA concentration from 0 to 50 percent of total dianhydride, oligomer length (n) from 10 to 30 repeat units, and total solids concentration from 7 to 10 wt % on properties of the aerogels.

Figure 14:
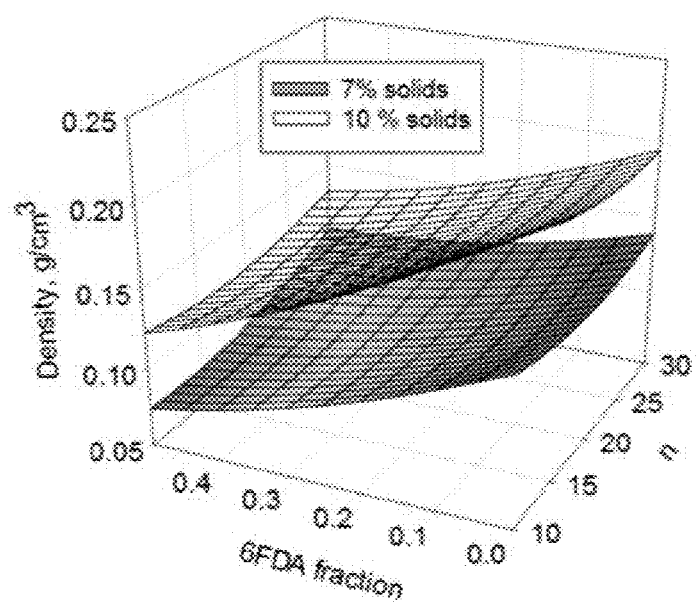
FIG. 14 is a graphical illustration of density relating to the aerogel in accordance with an aspect of the innovation.

Referring to FIG. 14, reducing total solids concentration in the initial solution for gelation led to lower density aerogels. Increasing amount of 6FDA also led to lower density due to a decrease in the shrinkage that occurred during processing.

Figure 15:
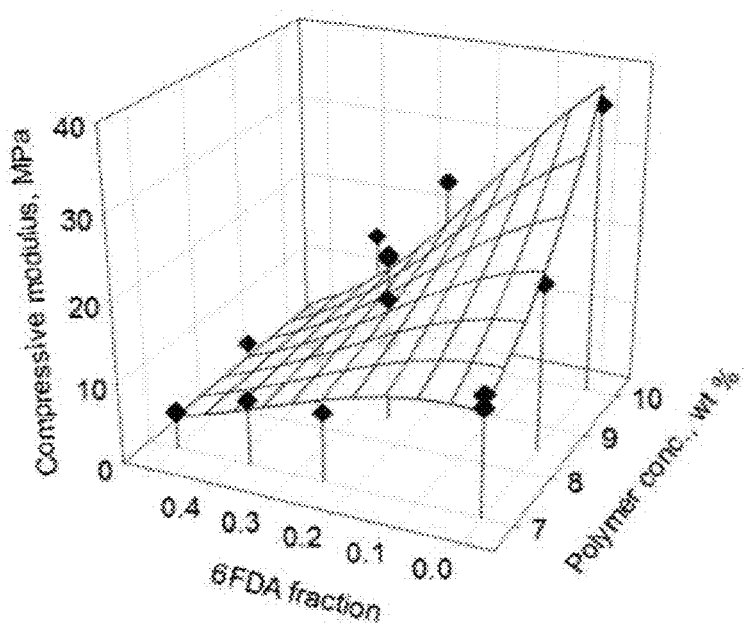
FIG. 15 is a graphical illustration of modulus from compression in accordance with an aspect of the innovation.

Referring to FIG. 15, as a measure of mechanical integrity, the compressive properties of the formulations were also evaluated. FIG. 15 shows the empirical model for modulus from compression, indicating the modulus decreases with decreasing solids concentration and increasing 6FDA fraction. Nevertheless, even the lowest modulus samples had modulus greater than 3 to 4 MPa.

Figure 16:
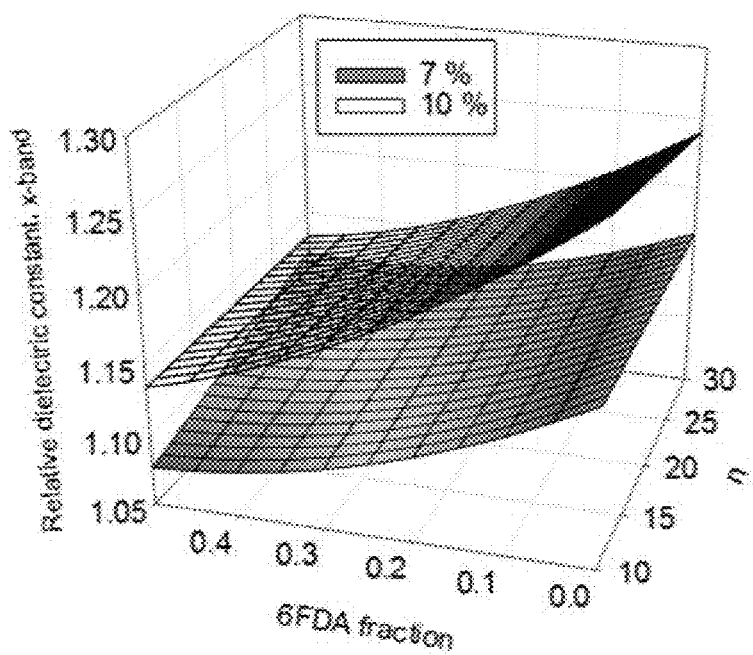
FIG. 16 is a graphical illustration of relative dielectric constant relating to the aerogel in accordance with an aspect of the innovation.

FIG. 16 shows the empirical model for relative dielectric constant of the PI aerogels in the experimental design. Dielectric constants ranged from 1.25 down to 1.08 for the lowest density samples. As seen in the graph, dielectric constant decreases with increasing 6FDA concentration and decreasing solids content. The empirical models for density and relative dielectric constant are nearly identical. This suggests that the dielectric properties are dominated by density of the aerogel, regardless of the amount of fluorine content.

Figure 17:
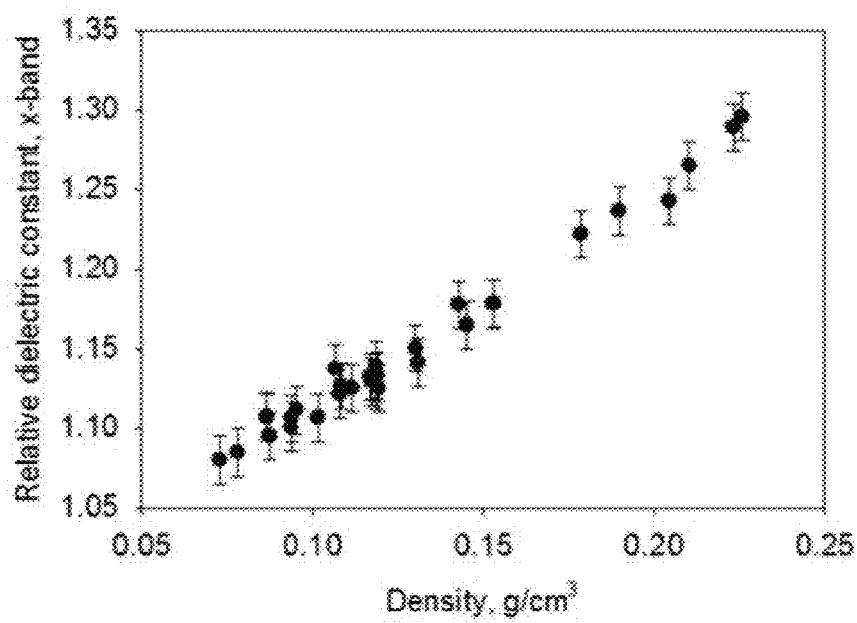
FIG. 17 is a graphical illustration of relative dielectric constant versus density in accordance with an aspect of the innovation.

In fact, FIG. 17 shows the dielectric constant plotted versus density, revealing a strong linear relationship independent of the amount of 6FDA used in the aerogels. These results show that it can be made with lower density by reducing solids concentration and it is expected that lower relative dielectric constants and better mechanical properties would be the result.

Referring to FIGS. 18A, 18B, 19A and 19B, a slot coupled approached was used to develop the phased array antennas.

The slot coupled approach facilitates the integration of beam shaping elements such as phase shifters and attenuators as well as power amplifiers (i.e., low noise for receive and high gain for transmit) into the antenna feed network. These components are essential for electronically steerable adaptively controlled antennas. Accordingly, the slot coupled approach demonstrates aerogel-based phased array antennas.

Figure 18A:
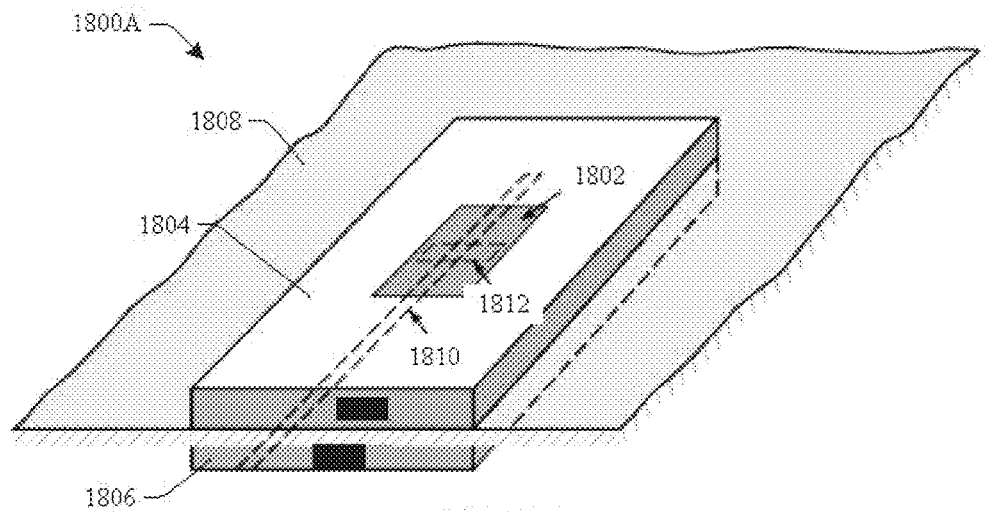
FIG. 18A illustrates a slot coupled patch antenna in accordance with an aspect of the innovation.

FIG. 18A illustrates a slot coupled patch antenna 1800 that includes a patch antenna 1802, a first substrate 1804, a second substrate 1806, and a ground plane 1808 that separates the first and second substrates 1804, 1806. Either the first substrate 1804 and/or the second substrate 1806 may be formed of an aerogel as disclosed herein. The slot coupled patch antenna 1800 further includes a transmission feedline 1810 disposed on a bottom of the second substrate 1806 that is coupled to the patch antenna 1802 through a slot 1812 defined in the ground plane 1808. This configuration allows independent optimization of the feed mechanism and the radiating element.

Figure 18B:
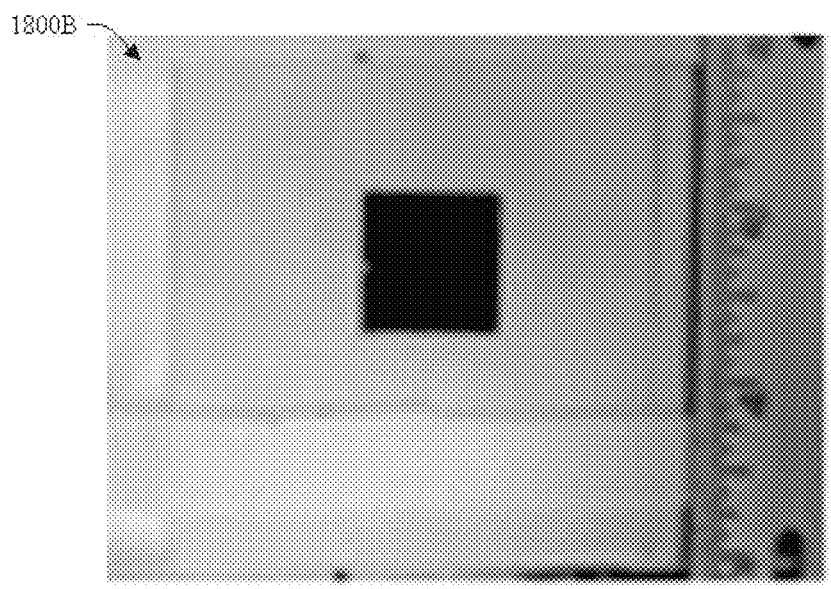
FIG. 18B is a sample ink jet-printed slot coupled patch antenna using an aerogel substrate in accordance with an aspect of the innovation.

FIG. 18B is an illustration of a sample ink jet printed slot coupled patch antenna 1800B. The photolithography process requires exposing the PI aerogels to a series of solutions (both aqueous and organic). Because of the highly porous nature of the aerogels (90 to 97 percent porosity), it has not yet been possible to avoid the absorption of these solutions into the aerogel during the process. As an alternative, the potential of using ink jet printing of the antenna patterns on the aerogel was examined. The antenna exhibited gain values of 4.5 and 7.7 dBi at 4.4 and 5.0 GHz, respectively, which are comparable to those obtained with the e-beam evaporation approach. Hence, this technique offers a viable alternative for the fabrication of antennas on aerogels or other substrates sensitive to the processing steps of standard chemical photolithography techniques.

Figure 19A:
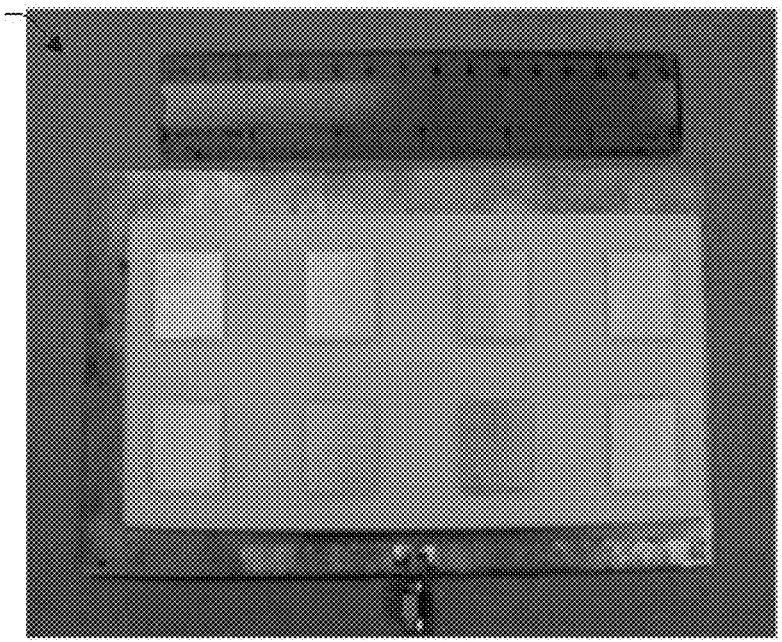
FIG. 19A shows a 2×4 slot coupled aerogel antenna array in accordance with an aspect of the innovation.
Figure 19B:
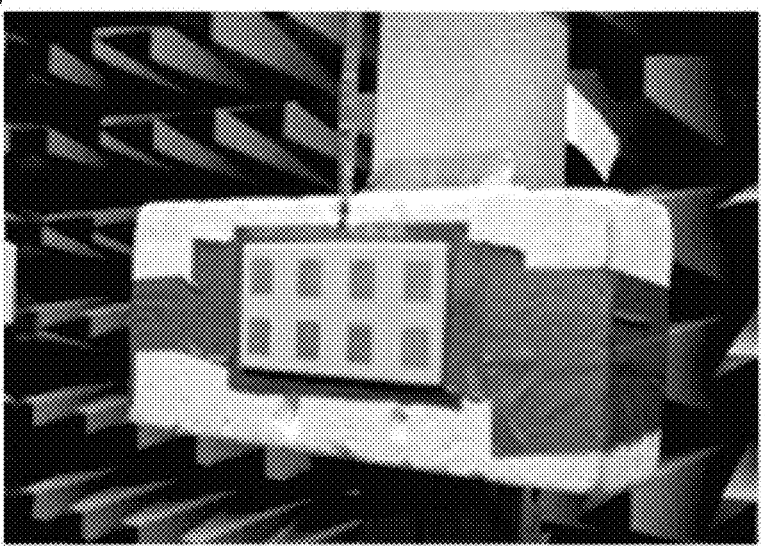
FIG. 19B shows the 2×4 array mounted for testing in accordance with an aspect of the innovation.

FIG. 19A shows a 2×4 phased array antenna 1900A on a PI aerogel substrate. The gold printed circuit patches of the phased array were deposited using e-beam evaporation. FIG. 19B shows a test configuration 1900B where the array 1900A is mounted for testing.

Figure 20A:
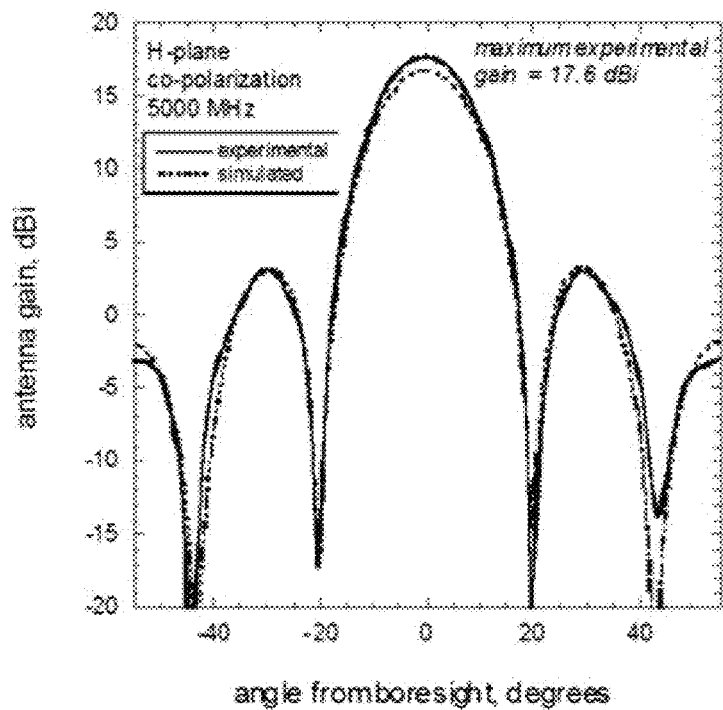
FIGS. 20A and 20B show the experimental and simulated H-plane and E-plane gain data respectively for the 2×4 array in accordance with an aspect of the innovation.
Figure 20B:
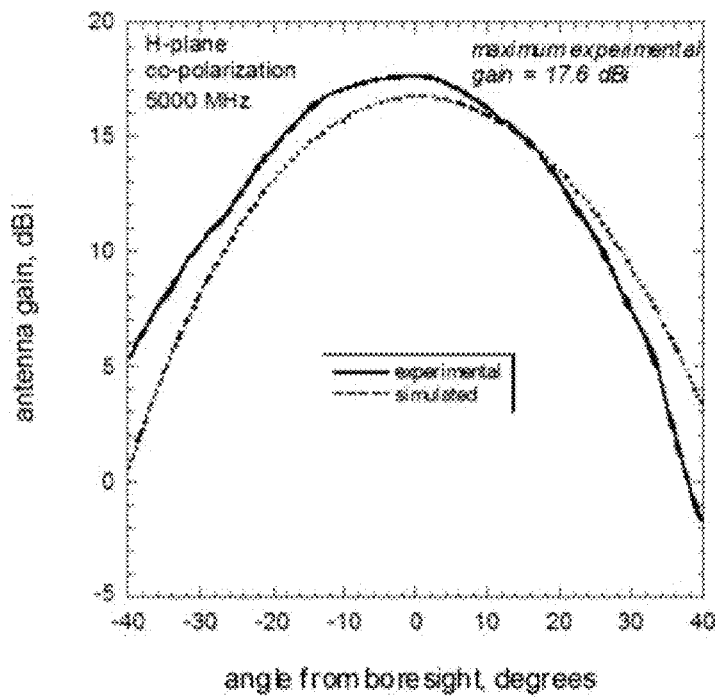

FIGS. 20A and 20B show the experimental and simulated H-plane and the E-plane gain data for this array at 5.0 GHz. The experimental and simulated results are in close agreement, indicating that this configuration can be scaled to larger arrays.

Figure 21A:
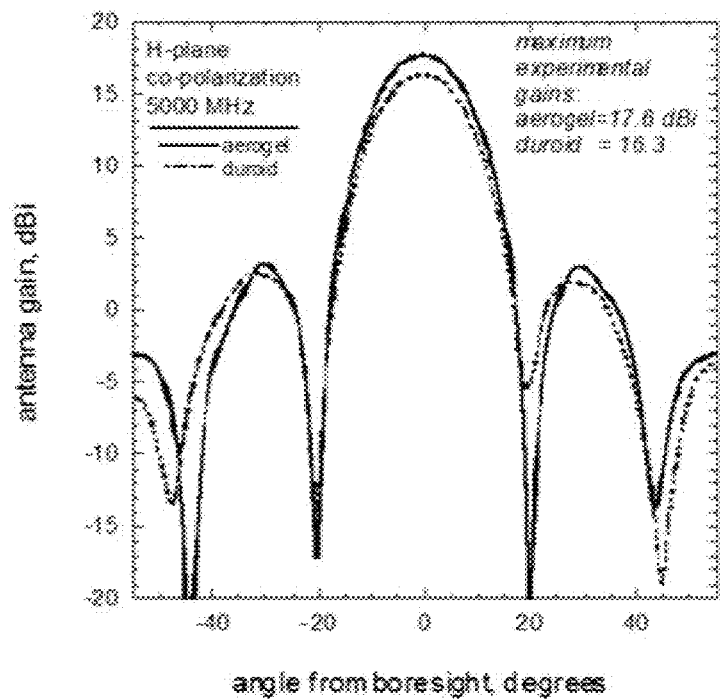
FIGS. 21A and 21B show the experimental and simulated H-plane and E-plane gain data respectively for the 2×4 array and a Duroid array in accordance with an aspect of the innovation.
Figure 21B:
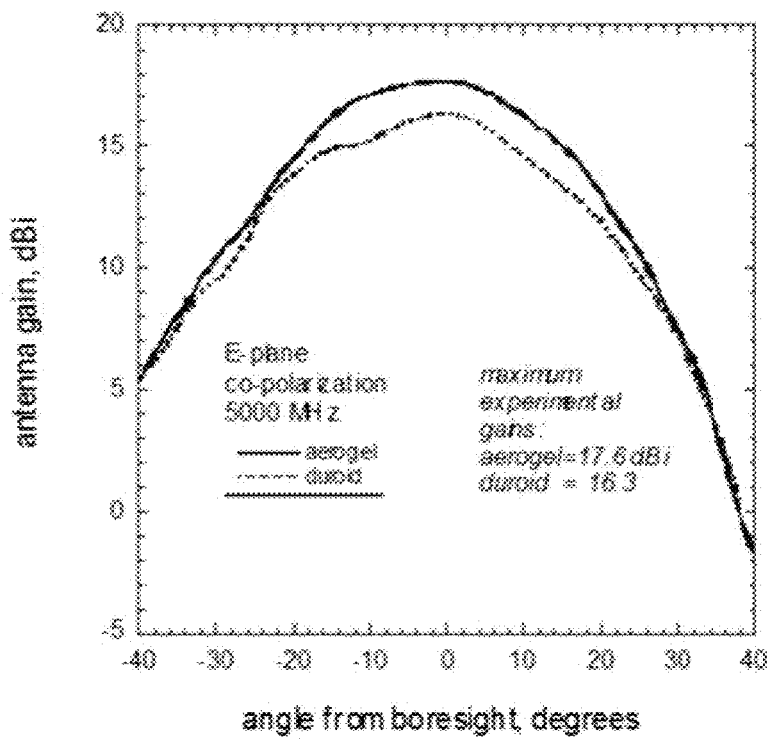

FIGS. 21A and 21B show a comparison of the performance of 2×4 phased arrays fabricated on aerogel and Duroid 5880 ($\varepsilon_r$=2.2) substrates shows that the aerogel antenna gain is more than 1 dB higher than its Duroid counterpart (17.6 versus 16.3, respectively). Also, the mass savings of the aerogel array are substantial as shown in Table 3.

TABLE 3

Mass comparison between 2 × 4 aerogel antenna and its Duroid counterpart

| Item | Aerogel | Duroid |
|---|---|---|
| Radiator tile only | 5.8 g (3.68 mm thick) | 88.1 g (3.18 mm thick) |
| Feed network and ground plane (i.e., 10 mil) Duroid with copper metallization) | 13.9 g | 14.4 g |
| SMA connector weight | 3.9 g (male) | 1.3 g (female) |
| Total antenna weight | 23.6 g | 103.8 g |

Figure 22:
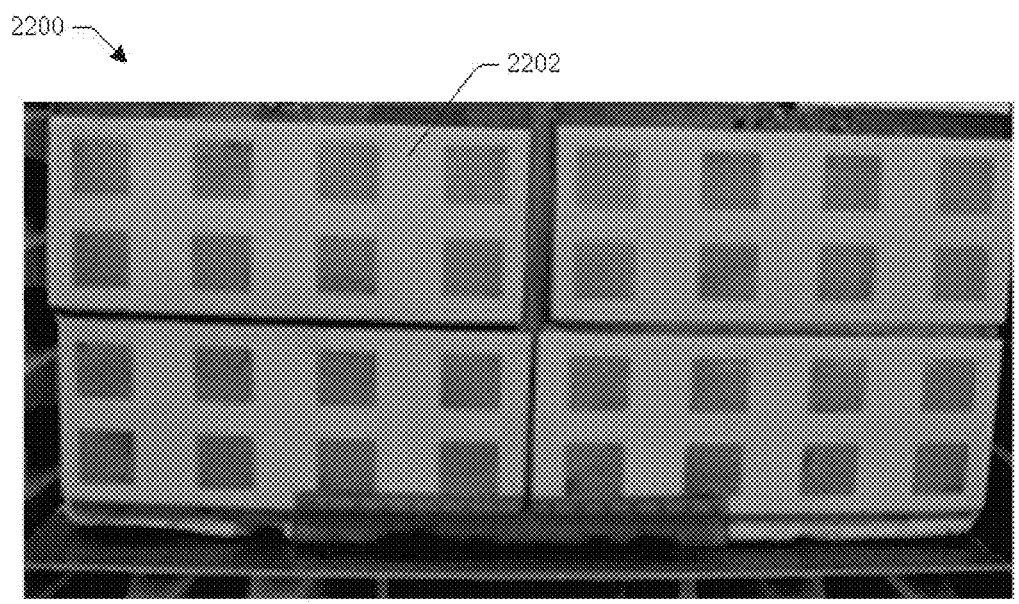
FIG. 22 shows a 32 element array in accordance with an aspect of the innovation.

Referring to FIG. 22, to further demonstrate the scalability of the aerogel phased arrays, a 32 element phased array 2200 made of four 2×4 aerogel tiles was fabricated.

Figure 23A:
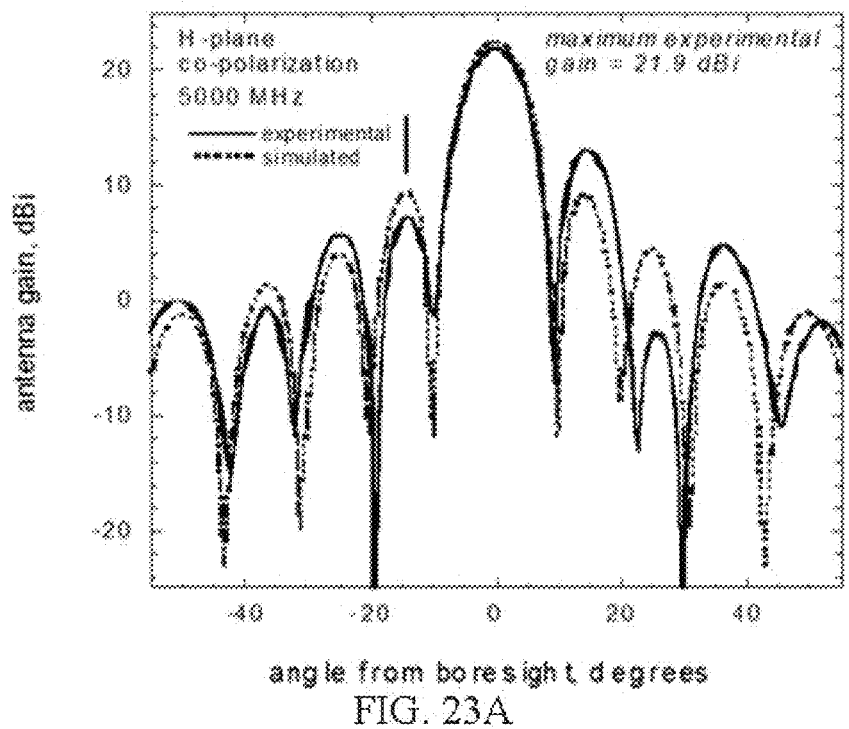
FIGS. 23A and 23B show the experimental and simulated H-plane and E-plane gain data respectively for the 32 element array in accordance with an aspect of the innovation.
Figure 23B:
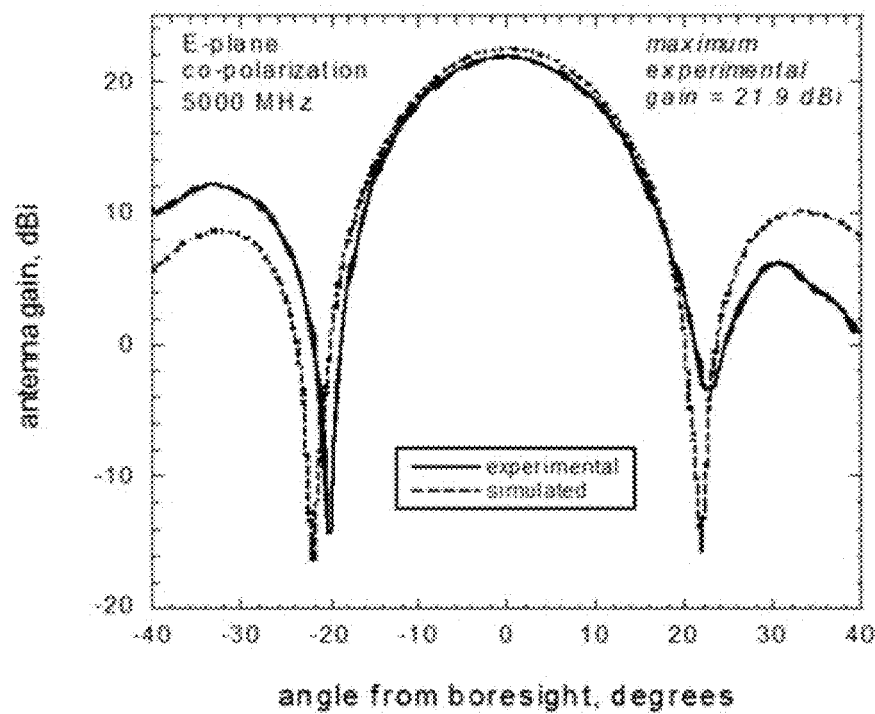

FIGS. 23A and 23B illustrate the experimental and modeled H-plane and the E-plane gain for this array at 5.0 GHz. The measured gain is consistent with a uniformly illuminated aperture.

Figure 24A:
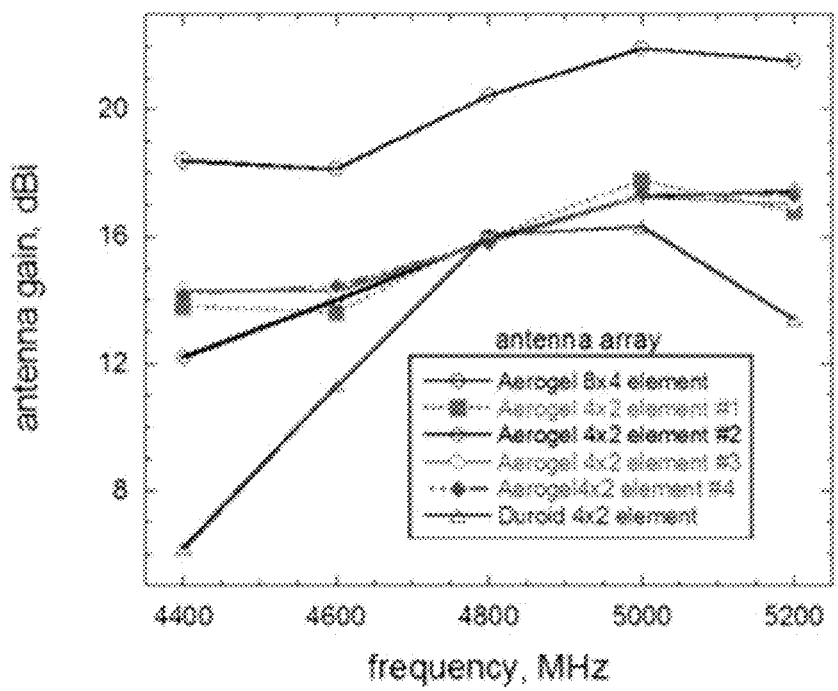
FIGS. 24A and 24B show the antenna gain and aperture efficiency respectively for the aerogel and Duroid arrays in accordance with an aspect of the innovation.
Figure 24B:
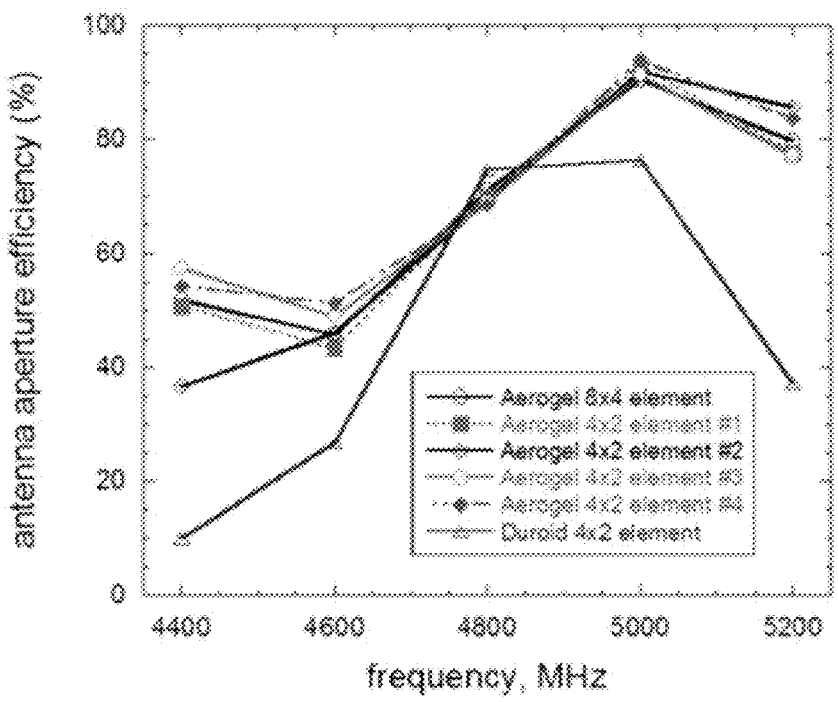

As shown in FIGS. 24A and 24B, the aerogel antennas surpass the Duroid counterpart in sustained gain over bandwidth and aperture efficiency.

To validate the usage of the aerogel phased array antennas for practical applications, a terrestrial line-of-sight (LOS) experiment was performed to investigate the suitability of the antennas to support digital communication links. The test was performed using modulation schemes such as Quadrature Phase Shift Keying (QPSK) and π/4-Differential Quadrature Phase Shift Keying (π/4-DQPSK). The integrity of the link was evaluated by performing Error Vector Magnitude (EVM) measurements which provide information on the extent to which experimental parameters associated with the quality of the link values deviate from reference link values.

Figure 25:
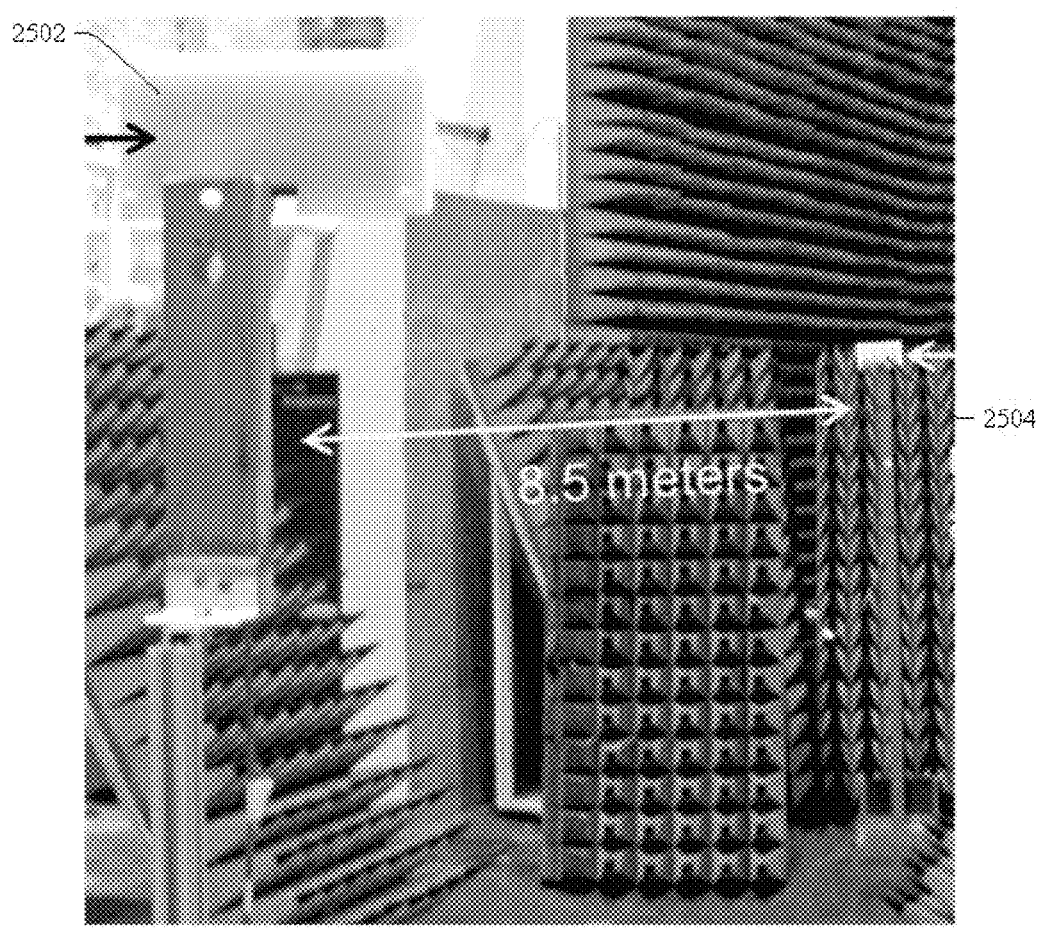
FIG. 25 shows an experimental set-up for Error Vector Magnitude (EVM) measurements in accordance with an aspect of the innovation.
Figure 26A:
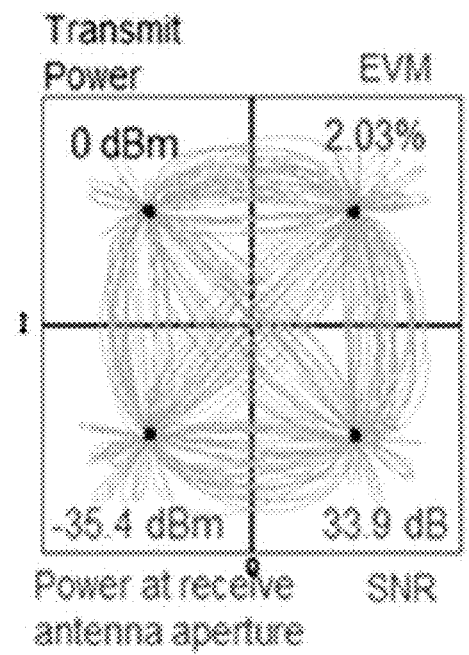
FIGS. 26A-26D show constellation graphs summarizing a performance of the 2×4 aerogel array using Quadrature Phase Shift Keying modulation in accordance with an aspect of the innovation.
Figure 26B:
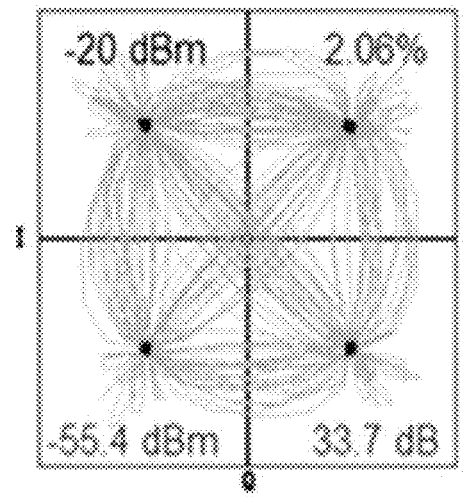
Figure 26C:
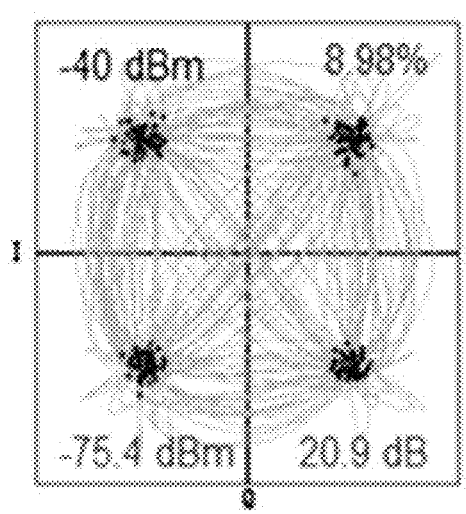
Figure 26D:
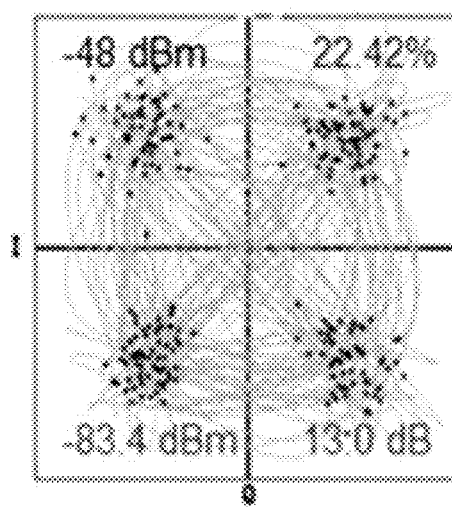
Figure 27A:
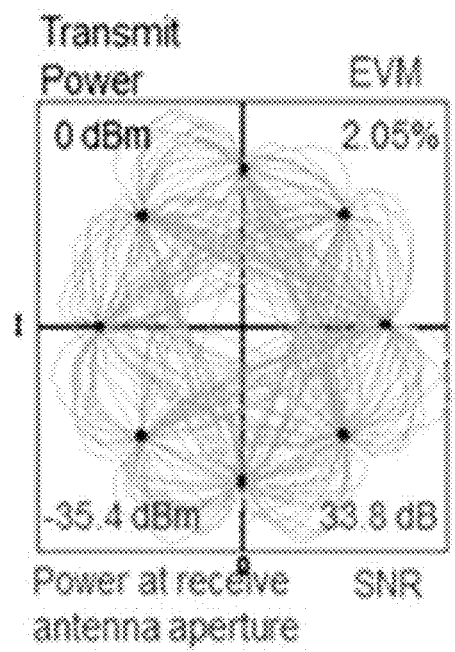
FIGS. 27A-27D show constellation graphs summarizing a performance of the 2×4 aerogel array using π/4-Differential Quadrature Phase Shift Keying modulation in accordance with an aspect of the innovation.
Figure 27B:
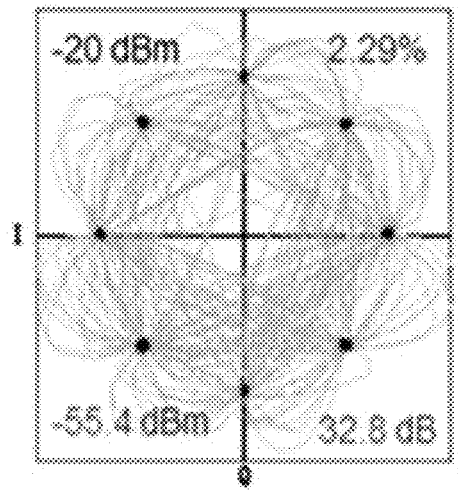
Figure 27C:
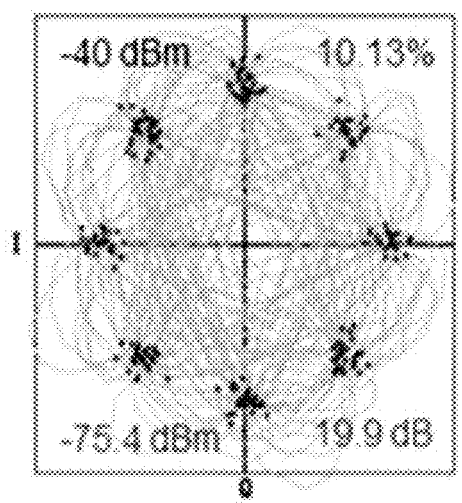
Figure 27D:
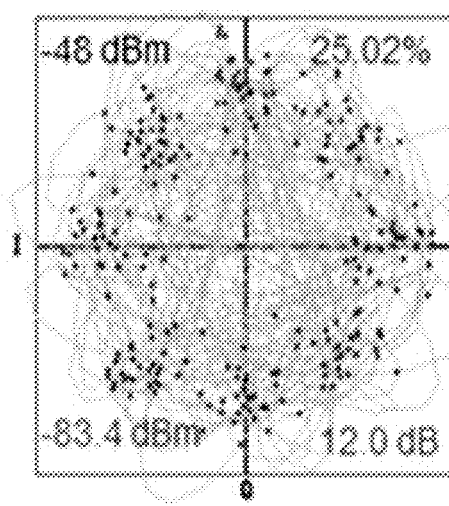

Referring to FIG. 25, the experimental set-up for the EVM consisted of two identical 2×4 aerogel phased array antennas, one used as the transmit antenna 2502 and the other as the receive antenna 2504, the antennas were separated by a distance of approximately 8.5 m as shown in FIG. 25. The aforementioned separation satisfies the $2D^2/\lambda$ far field criteria, where D is the maximum antenna aperture dimension and λ is the wavelength corresponding to the design frequency of the phased array. For the case under consideration D-16.1 cm, λ=6.0 cm and $2D^2/\lambda$=0.864 m.

FIGS. 26A-26D and 27A-27D show constellation graphs summarizing the performance of the 2×4 aerogel phased array antenna in the terrestrial link experiment using the aforementioned QPSK and π/4-DQPSK modulation schemes respectively. The experiment was performed at a carrier frequency=5.0 GHz; symbol rate=7 Msps; and data rate=14 Mbps. In order to overcome the instrumentation limitations posed by the spectrum analyzer used in this test an amplifier was placed between Rx antenna and spectrum analyzer. Note that as the transmitted power decreases from the transmit antenna 2502, the power received at the aerogel antenna 2504 decreases, the EVM increases and the signal-to-noise ratio (SNR) decreases. However, even at the lowest transmitted and received power levels for each of the modulation schemes, the constellation of points is still discernible indicating a viable digital communication link. The EVM measurements provide close approximation of signal to noise demodulated signal from which the bit-error-rate of the signal can be calculated.

Figure 28A:
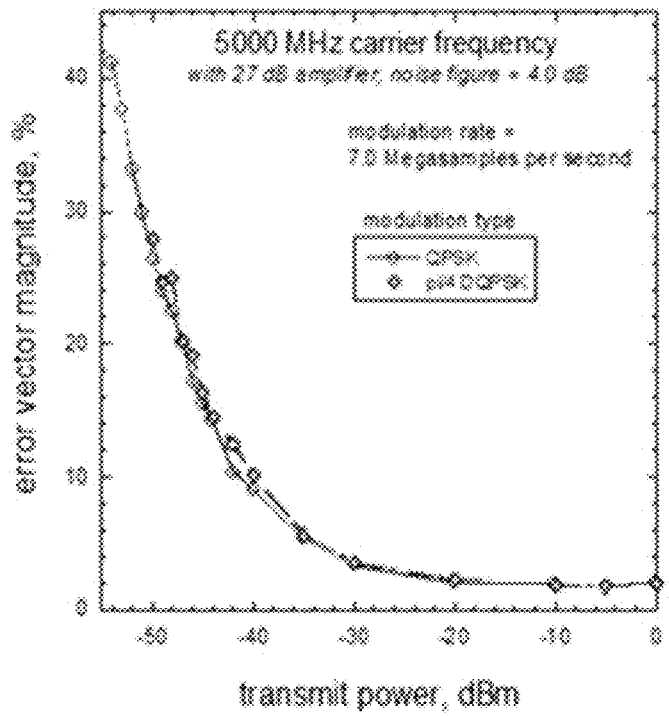
FIGS. 28A and 28B plots of EVM and signal-to-noise ratio versus for transmitted power for the aerogel phased array at 5.0 GHz in accordance with an aspect of the innovation.
Figure 28B:
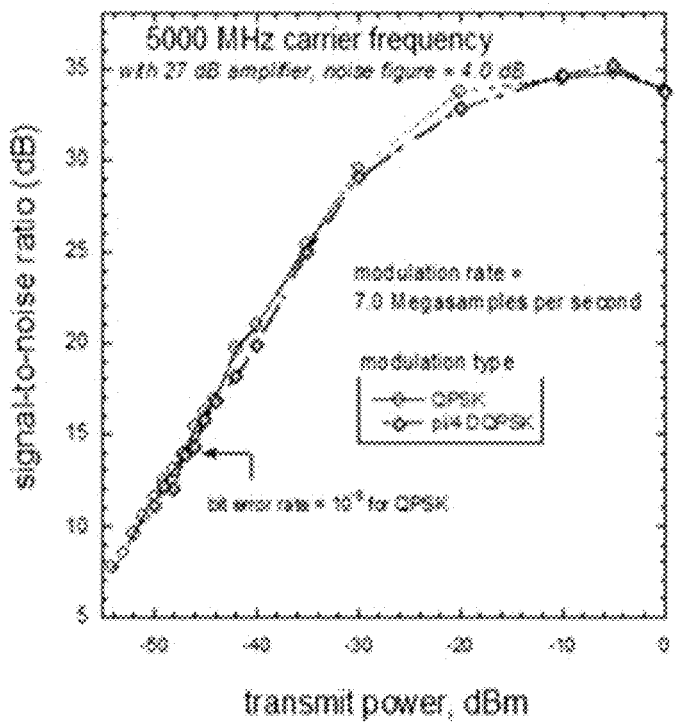

FIGS. 28A and 28B show plots of EVM and SNR versus for transmitted power for the aerogel phased array at 5.0 GHz. It is worthwhile to mention that when performing EVM of the phased array 4.6 GHz and 5.4 GHz (i.e., ±0.4 GHz away from the optimal operational frequency of the antenna) the antennas maintained communications links with approximately 2.0 dB loss relative to the performance at 5.0 GHz. These results are very encouraging not only for communications but also for radar applications where the wide operational frequency range would be very useful.

Figure 29:
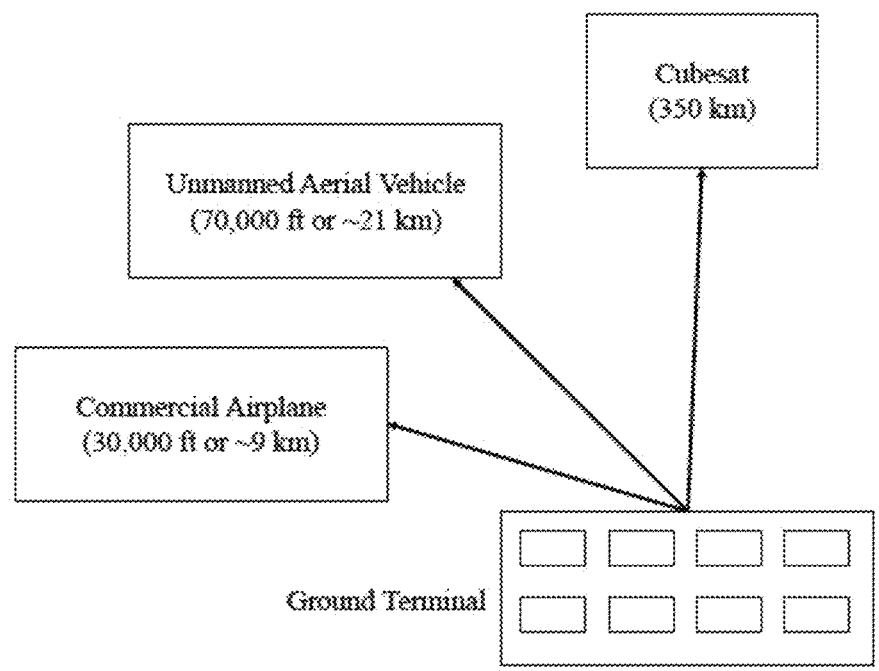
FIG. 29 illustrate various aerospace application for the innovative aerogel antenna in accordance with an aspect of the innovation.

Referring to FIG. 29, other uses where data rates could be enabled using the 2×4 aerogel phased array antennas include several relevant communication link scenarios, such as but not limited to, commercial aircraft to ground, unmanned air vehicles (UAV) to ground, and cubesats to ground. For these scenarios the following was considered: transmit and received 2×4 element aerogel phased array antennas at 5.0 GHz and with a gain of 15.6 dBi; transmit power=2 W; receiver noise figure=4 dB; QPSK modulation scheme; signal-to-noise ratio ≥14 dB; bit-error-rate (BER) ≤$10^{-6}$; no coding gain; and receiver implementation losses=3 dB. Table 4 below shows the data rate results when the aforementioned vehicles are 10° above the horizon (i.e., close to worst case scenario regarding free space losses). When the vehicles are directly overhead the free space losses are reduced by 7.5 dB and therefore the allowable date rates are 5.7 times higher than when the vehicle is near the horizon. Note that the date rates shown are enough to support voice and data (cubesat to ground case) and voice, data and video (UAV and commercial aircraft cases), which demonstrate the suitability of the aerogel phased array antennas to address communications requirements in these and similar platforms.

TABLE 4

Data Rates for Several Aerospace Vehicles for Elevations 10° Above the Horizon

| LINK | MAXIMUM LINK DISTANCE (km) | DATA RATE SUPPORTED |
|---|---|---|
| Cubesat-to-ground | 2000 | 38 kb/s |
| UAV-to-ground | 120 | 10 Mb/s |
| Commercial airplane-to-ground | 51 | 58 Mb/s |

In addition to the antenna embodiments disclosed herein, other antenna embodiments may include but not limited to, spiral antennas, planar traveling wave antennas, free space fed lens array antennas, or flexible antennas. Spiral antennas have a broad bandwidth that can be implemented with aerogel. The fabrication process for spiral antennas is similar to those embodiments disclosed herein. Benefits of using aerogel include mass savings, further enhancement in bandwidth, and enhancements in gain by virtue of wider microstrip for the spirals.

Planar traveling wave antennas could benefit from the use of aerogel in what regards to allowing for better impedance matching of the elements along the antenna.

Free Space Fed Lens Array Antennas may be used with the aerogel application where, again, benefits include the saving in mass/weight of the antenna as compared to state of the practice Flexible (i.e., wrap-able) antennas may also be used where the benefit is from the customizable flexibility and dielectric properties of the PI aerogel substrates. This type of antenna may be used conformal surfaces (e.g., aircrafts).

The use of novel aerogel materials as substrates for radio frequency (RF) antennas has been investigated. Optimized aerogel formulations led to lower dielectric properties, better moisture/solvent resistance, and better mechanical properties. Demonstrated herein was the feasibility of fabricating printed circuit antennas on optimized Polyimide aerogel materials either by e-beam evaporation or ink-jet printed techniques. The performance of single-patch and phased array aerogel antennas was demonstrated with both configurations exhibiting notable advantages in mass, bandwidth, and gain over typically used microwave substrate laminates (e.g., Duroid). The aerogel antennas were demonstrated both in thick as well as thin substrates, suggesting that the attributes of PI aerogels could be maximally exploited at S- or C-band frequencies where the large physical dimensions of the antennas offer the opportunity for tailoring the array parameters (i.e., radiator size, substrate thickness, etc.) to provide optimal gain, broad bandwidth and low mass as compared to typically used microwave laminate substrates. Higher frequencies aerogel antennas could be suitable for aerospace applications requiring low profile for drag reduction and that could benefit from conformal, low profile, and reduce complexity in design offered by the aerogel antennas studied in this work. Finally, digital communication links using common modulation schemes (e.g., QPSK and π/4-DQPSK) that could be used to support voice, data and video communication links in a variety of aerospace platforms such as UAV, commercial aircraft, and cubesats were demonstrated.

It is to be appreciated that components and techniques described herein can be used in conjunction with various electronic or computing environments, including processors, memory, storage, communications components using various protocols or interfaces, buses or other facilitative aspects for the interoperability of electronic components, and so forth. Additional parts, such as drives, displays, and other peripherals can also be integrated internally or externally. Various programs or software modules can run in or on such environments, and can make use of the components and techniques relating to antennas and others set forth herein. Various networking schemes can be implemented that employ some combination of antennas (or other aspects) described herein and the electronic environments described. While antennas are focused toward wireless communications, it is possible to integrate the same into Tx/Rx environments that still include wired paths. Such electronics environments can be accomplished using a variety of proprietary or standardized electronic devices. These devices can be "standalone" devices, or functioning in interconnected environments including clients, servers, shared resources, and so forth, made operable by information communicated between local and remote nodes.

What has been described above includes examples of the various aspects, and various versions thereof. It is, of course, not possible to describe every conceivable combination of components or methodologies for purposes of describing the various versions, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

It should be appreciated that any patent, publication, or other disclosure material, in whole or in part, that is said to be incorporated by reference herein, or otherwise implied to be related, is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. An antenna comprising:
   a first substrate;
   a second substrate coupled to the first substrate; and
   a metallized portion deposited on the first substrate,
   wherein the first substrate is a polymer aerogel consisting entirely of polymer material.

2. The antenna of claim 1, wherein the second substrate in an aerogel.

3. The antenna of claim 2 further comprising a ground plane disposed between the first substrate and the second substrate.

4. The antenna of claim 3 further comprising a slot defined in the ground plane and a feed line disposed on the second substrate, wherein the slot facilitates an electric coupling of the feed line to the metallized portion.

5. The antenna of claim 1, wherein the metallized portion includes an antenna pattern.

6. The antenna of claim 1, wherein the polymer aerogel is a polyimide aerogel.

7. The antenna of claim 6, wherein the polyimide aerogel is a fluorinated polyimide aerogel.

8. The antenna of claim 7, wherein the polyimide aerogel is made with fluorinated dianhydride, 2,2-bis (3,4-dicarboxyphenyl) hexafluoropropane dianhydride (6FDA).

9. The antenna of claim 2, wherein the first substrate, second substrate, and the metallized portion comprise a patch antenna.

10. The antenna of claim 2, wherein the aerogel is flexible.

11. A system comprising an antenna array including a plurality of antennas fabricated at least in part using a polymer aerogel consisting entirely of polymer material.

12. The system of claim 11, wherein the plurality of antennas are patch antennas.

13. The antenna of claim 11, wherein the polymer aerogel is a polyimide aerogel.

14. The antenna of claim 13, wherein the polyimide aerogel is a fluorinated polyimide aerogel.

15. The antenna of claim 14, wherein the polyimide aerogel is made with fluorinated dianhydride, 2,2-bis (3,4-dicarboxyphenyl) hexafluoropropane dianhydride (6FDA).

16. A method for making an antenna comprising:
 forming a first polymer aerogel substrate consisting entirely of polymer material; and
 applying a metal element to the first polymer aerogel substrate.

17. The method of claim 16 further comprising forming a second aerogel substrate coupled to the first polymer aerogel substrate.

18. The method of claim 17 further comprising providing a ground plane disposed between the first polymer aerogel substrate and the second aerogel substrate, wherein a slot defined in the ground plane electrically couples the metal element to a feed line disponed on the second aerogel substrate.

19. The antenna of claim 18, wherein the polymer aerogel is a fluorinated polyimide aerogel.

20. The antenna of claim 19, wherein the polyimide aerogel is made with fluorinated dianhydride, 2,2-bis (3,4-dicarboxyphenyl) hexafluoropropane dianhydride (6FDA).

* * * * *